US012615299B2

(12) United States Patent
Horesh et al.

(10) Patent No.: US 12,615,299 B2
(45) Date of Patent: Apr. 28, 2026

(54) ACCESS CONTROL POLICY MANAGEMENT

(71) Applicant: Intuit, Inc., Mountain View, CA (US)

(72) Inventors: Yair Horesh, Kefar-Sava (IL); Yaron Sheffer, Tel Aviv (IL); Boaz Sapir, Tel Aviv (IL); Margarita Vald, Tel Aviv (IL); Mike Rooz, Hod Hasharon (IL)

(73) Assignee: Intuit Inc., Mountainview (CA)

( * ) Notice: Subject to any disclaimer, the term of this patent is extended or adjusted under 35 U.S.C. 154(b) by 209 days.

(21) Appl. No.: 18/489,256

(22) Filed: Oct. 18, 2023

(65) Prior Publication Data

US 2025/0133118 A1      Apr. 24, 2025

(51) Int. Cl.
*G06F 21/00* (2013.01)
*H04L 9/40* (2022.01)

(52) U.S. Cl.
CPC .............. *H04L 63/20* (2013.01); *H04L 63/10* (2013.01); *H04L 63/1425* (2013.01)

(58) Field of Classification Search
CPC ...... H04L 63/20; H04L 63/10; H04L 63/1425
See application file for complete search history.

(56) References Cited

U.S. PATENT DOCUMENTS

| | | | |
|---|---|---|---|
| 2009/0307296 A1* | 12/2009 | Gibbs | G06F 16/435 |
| | | | 708/607 |
| 2018/0211182 A1* | 7/2018 | Lei | G06V 10/7715 |
| 2019/0171689 A1* | 6/2019 | Kachkach | G06F 16/9038 |
| 2019/0199731 A1* | 6/2019 | Park | H04L 63/102 |
| 2019/0327271 A1* | 10/2019 | Saxena | H04L 41/16 |
| 2020/0274894 A1* | 8/2020 | Argoeti | H04L 63/1433 |
| 2023/0053182 A1* | 2/2023 | Bertiger | H04L 63/1425 |

OTHER PUBLICATIONS

Snasel et al "Matrix Factorization Approach for Feature Deduction and Design of Intrusion Detection Systems", The Fourth International Conference on Information Assurance and Security (2008, pp. 172-179) (Year: 2008).*
Wikipedia contributors. Non-negative matrix factorization. Wikipedia, The Free Encyclopedia. Oct. 2, 2023, 20:51 UTC. Available at: https://en.wikipedia.org/w/index.php?title=Non-negative_matrix_factorization&oldid=1178306255.

* cited by examiner

*Primary Examiner* — Michael M Lee
(74) *Attorney, Agent, or Firm* — Dinsmore & Shohl LLP

(57) ABSTRACT

Certain aspects of the disclosure provide techniques for access control policy management. A method generally includes factorizing a user access co-occurrence data element to generate two data sub-elements, wherein: the user access co-occurrence data element represents co-occurrences between users of a system and resources of the system, a product of the two data sub-elements approximates the user access co-occurrence data element, and each of the two data sub-elements has reduced dimensionality compared to the user access co-occurrence data element; generating an approximated user access co-occurrence data element based on the product of the two data sub-elements; comparing the user access co-occurrence data element and the approximated user access co-occurrence data element to determine one or more anomalies, wherein each of the one or more anomalies relates to access for a user to a resource of the system; and taking one or more actions to rectify the one or more anomalies.

20 Claims, 12 Drawing Sheets

100
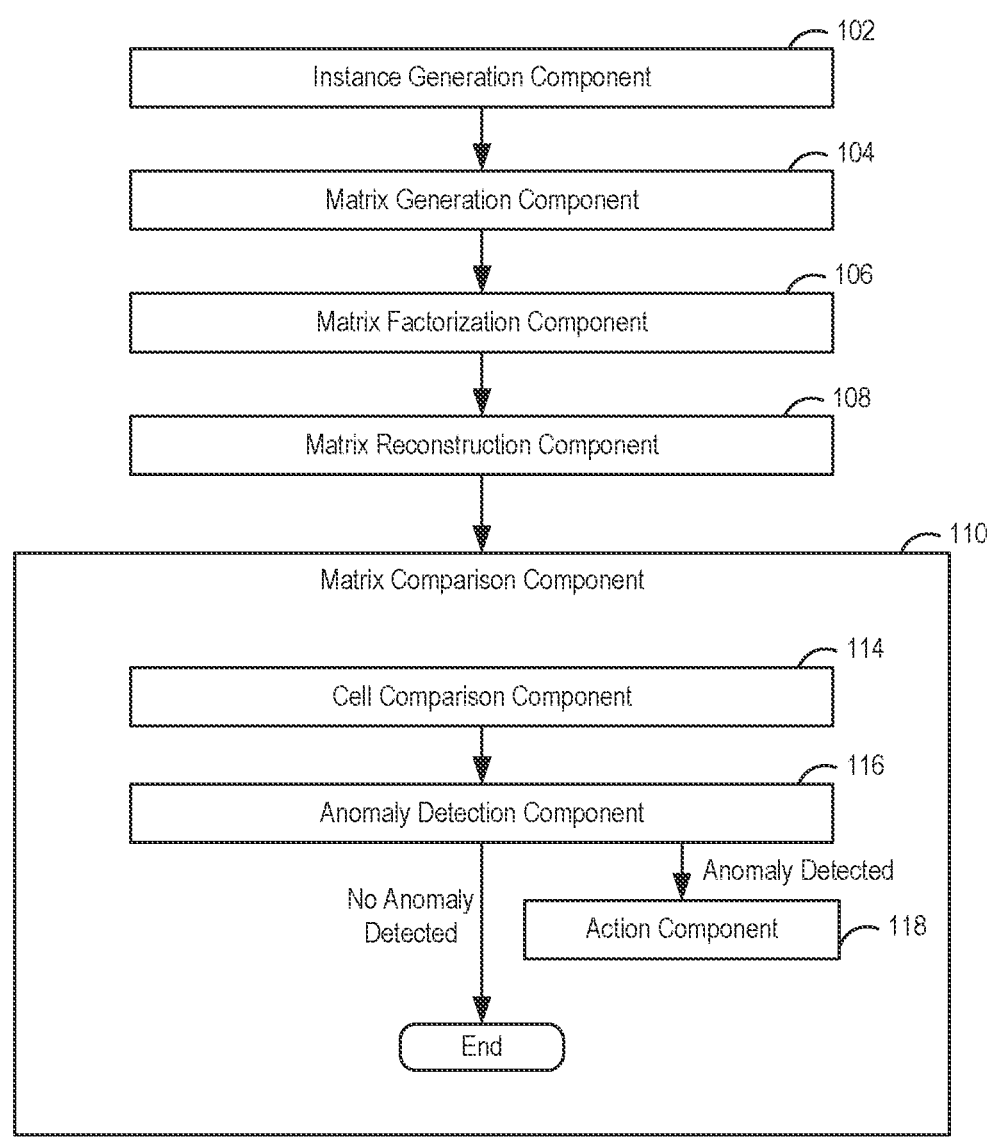
Instance Generation Component ⌐ 102
Matrix Generation Component ⌐ 104
Matrix Factorization Component ⌐ 106
Matrix Reconstruction Component ⌐ 108
Matrix Comparison Component ⌐ 110
Cell Comparison Component ⌐ 114
Anomaly Detection Component ⌐ 116
Anomaly Detected
No Anomaly Detected
Action Component ⌐ 118
End
*FIG. 1A*

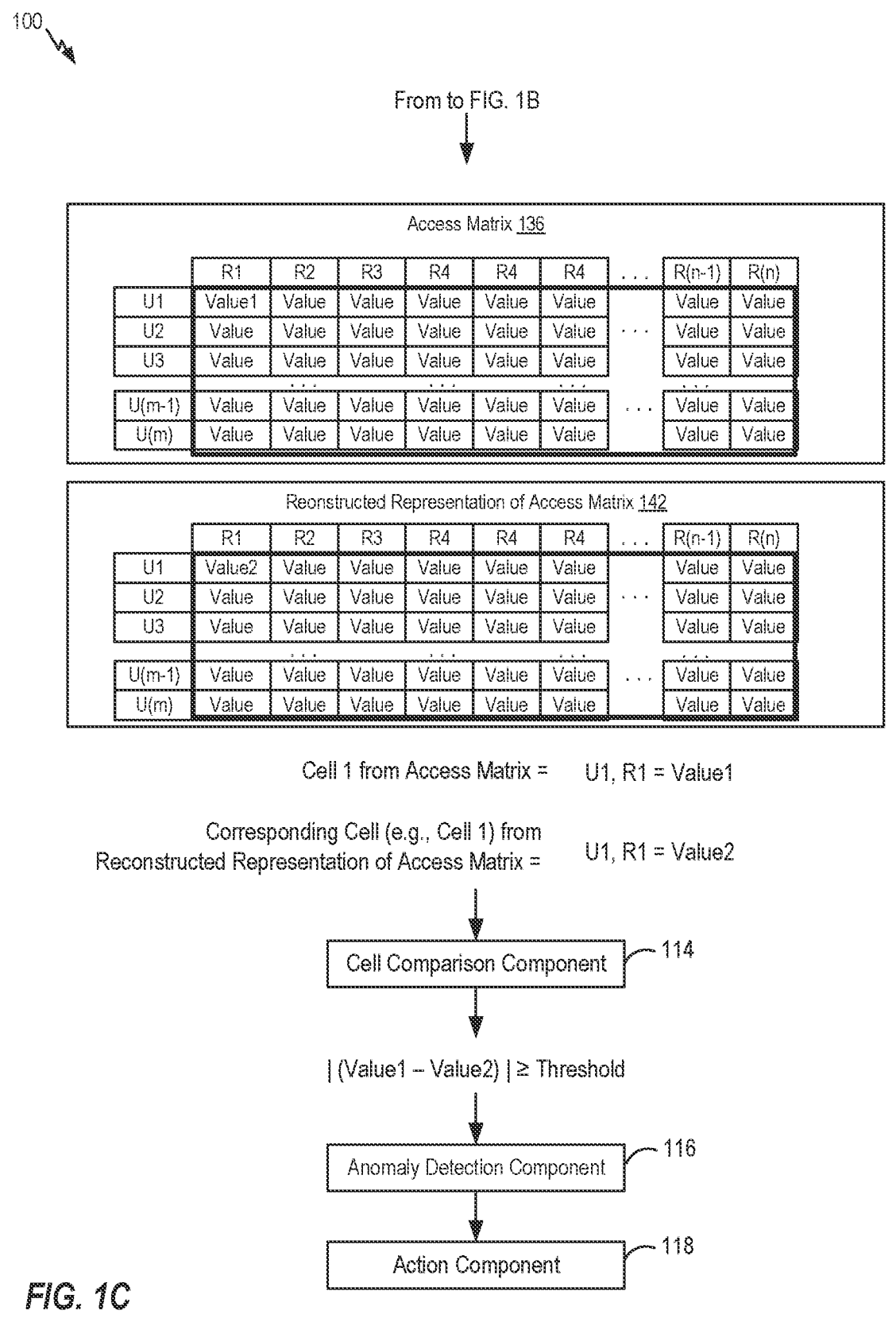

From to FIG. 1B

Access Matrix 136

|  | R1 | R2 | R3 | R4 | R4 | R4 | ... | R(n-1) | R(n) |
|---|---|---|---|---|---|---|---|---|---|
| U1 | Value1 | Value | Value | Value | Value | Value | | Value | Value |
| U2 | Value | Value | Value | Value | Value | Value | ... | Value | Value |
| U3 | Value | Value | Value | Value | Value | Value | | Value | Value |
| U(m-1) | Value | Value | Value | Value | Value | Value | ... | Value | Value |
| U(m) | Value | Value | Value | Value | Value | Value | | Value | Value |

Reonstructed Representation of Access Matrix 142

|  | R1 | R2 | R3 | R4 | R4 | R4 | ... | R(n-1) | R(n) |
|---|---|---|---|---|---|---|---|---|---|
| U1 | Value2 | Value | Value | Value | Value | Value | | Value | Value |
| U2 | Value | Value | Value | Value | Value | Value | ... | Value | Value |
| U3 | Value | Value | Value | Value | Value | Value | | Value | Value |
| U(m-1) | Value | Value | Value | Value | Value | Value | ... | Value | Value |
| U(m) | Value | Value | Value | Value | Value | Value | | Value | Value |

Cell 1 from Access Matrix =    U1, R1 = Value1

Corresponding Cell (e.g., Cell 1) from
Reconstructed Representation of Access Matrix =    U1, R1 = Value2

Cell Comparison Component    — 114

| (Value1 – Value2) | ≥ Threshold

Anomaly Detection Component    — 116

Action Component    — 118

*FIG. 1C*

400

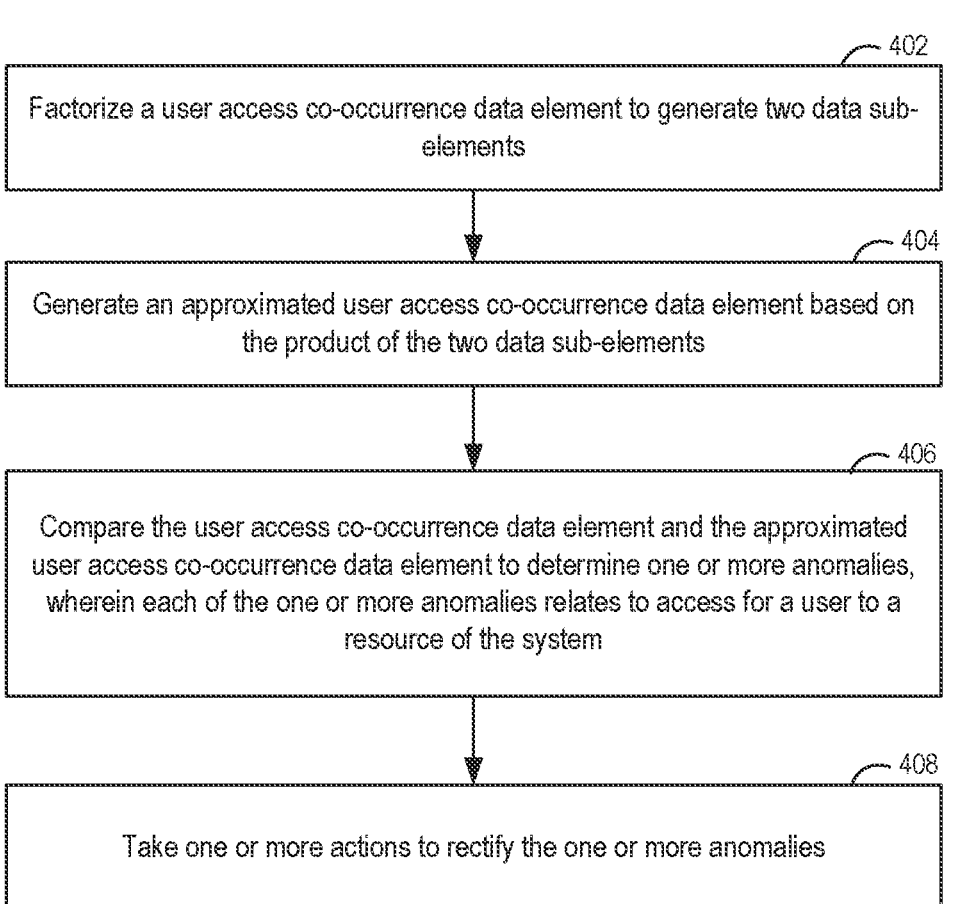

402

Factorize a user access co-occurrence data element to generate two data sub-elements

404

Generate an approximated user access co-occurrence data element based on the product of the two data sub-elements

406

Compare the user access co-occurrence data element and the approximated user access co-occurrence data element to determine one or more anomalies, wherein each of the one or more anomalies relates to access for a user to a resource of the system

408

Take one or more actions to rectify the one or more anomalies

FIG. 4

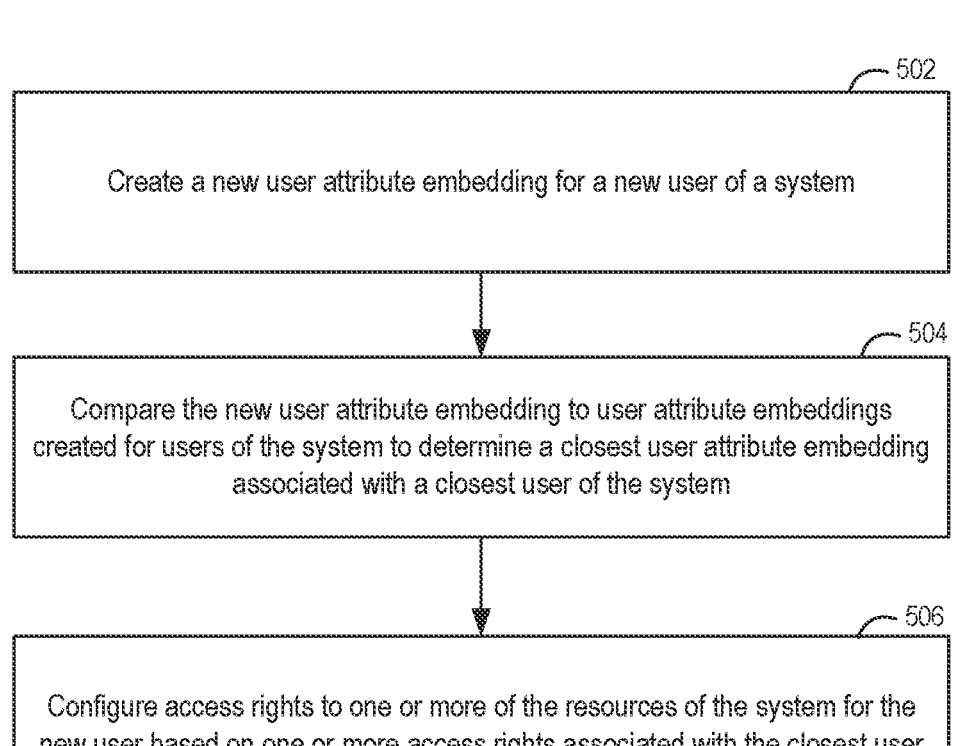

502

Create a new user attribute embedding for a new user of a system

504

Compare the new user attribute embedding to user attribute embeddings created for users of the system to determine a closest user attribute embedding associated with a closest user of the system

506

Configure access rights to one or more of the resources of the system for the new user based on one or more access rights associated with the closest user

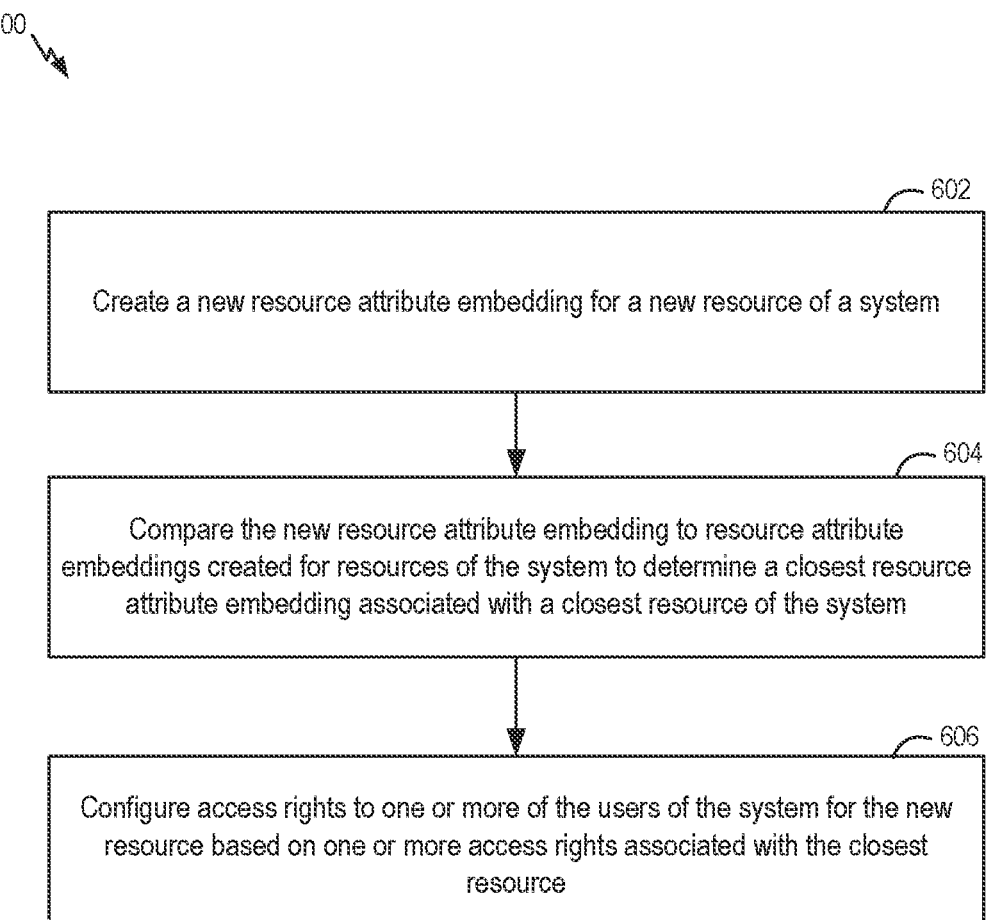

602

Create a new resource attribute embedding for a new resource of a system

604

Compare the new resource attribute embedding to resource attribute embeddings created for resources of the system to determine a closest resource attribute embedding associated with a closest resource of the system

606

Configure access rights to one or more of the users of the system for the new resource based on one or more access rights associated with the closest resource

FIG. 6

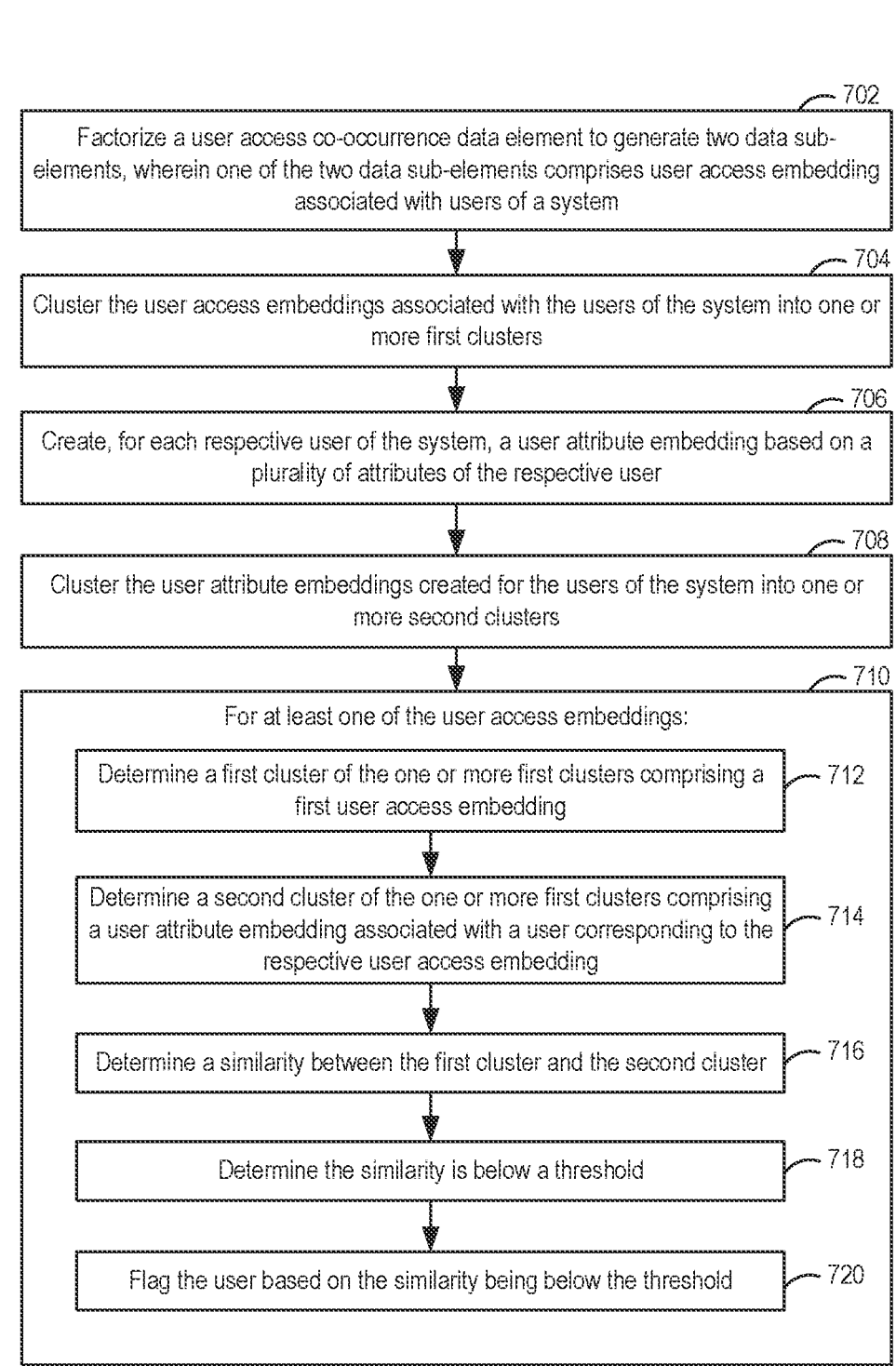

700

702

Factorize a user access co-occurrence data element to generate two data sub-elements, wherein one of the two data sub-elements comprises user access embedding associated with users of a system

704

Cluster the user access embeddings associated with the users of the system into one or more first clusters

706

Create, for each respective user of the system, a user attribute embedding based on a plurality of attributes of the respective user

708

Cluster the user attribute embeddings created for the users of the system into one or more second clusters

710

For at least one of the user access embeddings:

712

Determine a first cluster of the one or more first clusters comprising a first user access embedding

714

Determine a second cluster of the one or more first clusters comprising a user attribute embedding associated with a user corresponding to the respective user access embedding

716

Determine a similarity between the first cluster and the second cluster

718

Determine the similarity is below a threshold

720

Flag the user based on the similarity being below the threshold

FIG. 7

ACCESS CONTROL POLICY MANAGEMENT

BACKGROUND

Field

Aspects of the present disclosure relate to access control policy management.

Description of Related Art

Access control is a security technique that regulates who and what can view and/or use any given building, room, document, asset, resource in a computing environment, and the like. The goal of access control is to minimize the security risk of unauthorized access to physical and/or logical systems.

Physical access control is the restriction of access to a physical space or thing. To secure a physical space, electronic access control systems may be used, which rely on user credentials, access card readers, and/or reports to track user access to restricted locations, such as data centers. Some of these systems incorporate access control panels to restrict entry to rooms and buildings, as well as alarms and/or lockdown capabilities, to prevent unauthorized access and/or operations.

Alternatively, logical access control limits connections to computer networks, system files, data, resources, and the like. Logical access control systems perform identification, authentication, and authorization of users and/or entities by, for example, evaluating required login credentials that can include passwords, personal identification numbers (PINs), biometric scans, security tokens and/or other authentication factors. In some cases, multifactor authentication (MFA), which requires two or more authentication factors, is used as a layered defense to protect logical access control systems.

Generally, access control techniques minimize the risk of unauthorized access to physical and computer systems, thereby forming a foundational part of information security, data security, and network security. Additionally, access control may help to ensure regulatory compliance (e.g., regulations that mandate the protection of sensitive data), optimize resource usage (e.g., restricting user access to only what is necessary), and/or enable business continuity (e.g., safeguard against unauthorized access, which may disrupt operations), to name a few examples.

SUMMARY

Certain aspects provide a method of computationally efficient anomaly detection. The method generally includes factorizing a user access co-occurrence data element to generate two data sub-elements, wherein: the user access co-occurrence data element represents co-occurrences between users of a system and resources of the system, a product of the two data sub-elements approximates the user access co-occurrence data element, and each of the two data sub-elements has reduced dimensionality compared to the user access co-occurrence data element; generating an approximated user access co-occurrence data element based on the product of the two data sub-elements; comparing the user access co-occurrence data element and the approximated user access co-occurrence data element to determine one or more anomalies, wherein each of the one or more anomalies relates to access for a user to a resource of the system; and taking one or more actions to rectify the one or more anomalies.

Certain aspects provide a method for assigning access rights to resources of a system. The method generally includes creating a new user attribute embedding for a new user of the system; comparing the new user attribute embedding to user attribute embeddings created for users of the system to determine a closest user attribute embedding associated with a closest user of the system; and configuring access rights to one or more of the resources of the system for the new user based on one or more access rights associated with the closest user.

Certain aspects provide a method for assigning access rights to resources of a system. The method generally includes creating a new resource attribute embedding for a new resource of the system; comparing the new resource attribute embedding to resource attribute embeddings created for resources of the system to determine a closest resource attribute embedding associated with a closest resource of the system; and configuring access rights to one or more of the users of the system for the new resource based on one or more access rights associated with the closest resource.

Certain aspects provide a method of access rights management. The method generally includes factorizing a user access co-occurrence data element to generate two data sub-elements, wherein: the user access co-occurrence data element represents co-occurrences between users of a system and resources of the system, a product of the two data sub-elements approximates the user access co-occurrence data element, each of the two data sub-elements has reduced dimensionality compared to the user access co-occurrence data element, and one of the two data sub-elements comprises user access embeddings associated with the users of the system; clustering the user access embeddings associated with the users of the system into one or more first clusters; creating, for each respective user of the system, a user attribute embedding based on a plurality of attributes of the respective user; clustering the user attribute embeddings created for the users of the system into one or more second clusters; for at least one of the user access embeddings: determining a first cluster of the one or more first clusters comprising a first user access embedding; determining a second cluster of the one or more first clusters comprising a user attribute embedding associated with a user corresponding to the respective user access embedding; determining a similarity between the first cluster and the second cluster; determining the similarity is below a threshold; and flagging the user based on the similarity being below the threshold.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIGS. 1A-1C depict an example access control management system configured to manage user access to one or more resources.

FIG. 4 depicts an example method for computationally efficient anomaly detection.

FIG. 5 depicts an example method for assigning access rights to resources of a system.

FIG. 6 depicts an example method for assigning access rights to users of a system.

FIG. 7 depicts an example method for access rights management.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1B:
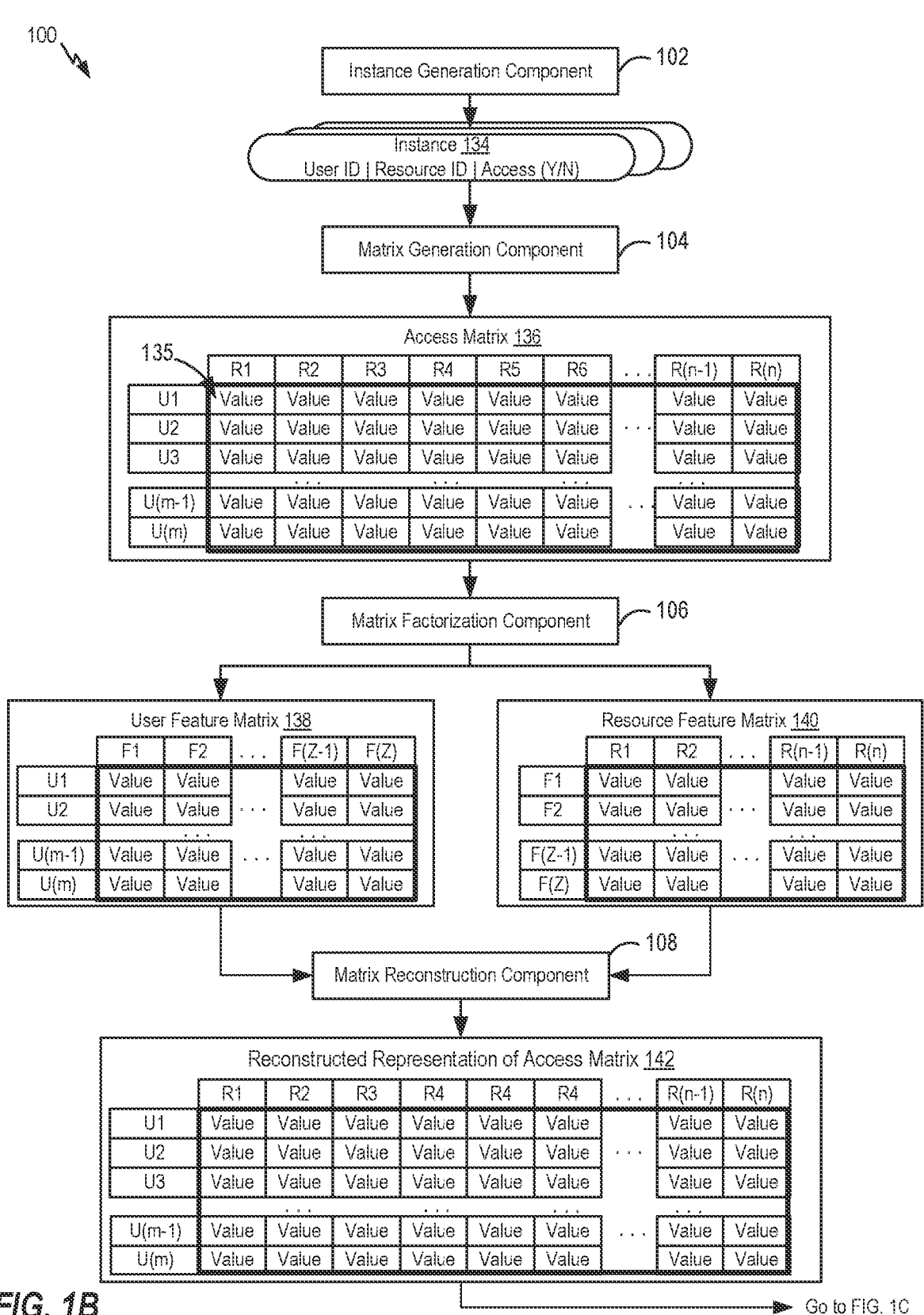

An access control system may be built on one or more access control policies. Access control policies specify which subject (e.g., human user, process, application, etc.) can access which protected resources (e.g., files, database relations, etc.) for performing which actions (e.g., read, write, etc.), and thus are the basis for access control decisions. Assuring the effectiveness of such policies presents a technical problem in access control systems, however. In particular, the problem of assuring the effectives of access control policies involves making sure that the policies are consistent, minimal, and complete.

A consistent access control policy is one in which access control for similarly-situated subjects and/or access control to similarly-situated resources is similar or the same. For example, an organization may define access control policies for employees based on their respective levels within the organization. Maintaining a level of consistency across an organization may be difficult as the number of users change (e.g., new employees are hired, retire, quit, etc.), users change roles (e.g., employees are promoted, change departments, etc.), and the number of resources subject to access control policies changes. Such maintenance becomes even more difficult in situations where one or more exceptions to the policy are allowed. An exception is any change to an implemented policy that violates the "normal" or "default" access control defined by the policy. Adding an exception to a policy adds an additional layer of management to the policy.

A minimal access control policy is one that does not include any unnecessary and/or redundant access privileges granted to subjects of the policy. Unnecessary access privileges are privileges granted to a subject that are more than what is minimally required for the subject to perform its necessary tasks(s). Redundant access privileges refer to duplicative privileges granted to a subject. Granting unnecessary and/or redundant access privileges increases the number of potential points of entry for threat actors (e.g., cybercriminals), thereby increasing the risk of attack and/or a data breach.

A complete access control policy is one that has a policy for any action to be executed by the subjects of the system. If for a given access request, there is no corresponding policy, the default decision taken by an access control system may be to deny the access. Such an approach, however, may lead to situations where subjects that have a legitimate reason for accessing the protected resource, and thus should be granted access, are denied access.

In other words, effective control access policies, when implemented, ensure a correct subject has access to a correct resource at the correct time, all of the time. Effective control access policies limit resource access to those resources necessary for performing one or more tasks with minimal, or no, interruption. Further, effective control access policies are dynamic to account for changes in subjects, resources, actions, and/or privileges granted to subjects.

Conventional approaches to access control policy management tend to rely on access-control policy professionals to effectively control access to resources within an organization. Access control policy professionals are required to have a good working understanding of the policy(ies) they maintain as well as the number and type of users within the organization subject to access control. This becomes rather challenging where access-control policy professionals have to control access to thousands of resources within the organization for thousands of users. This difficulty is further compounded where these resources and/or users are constantly changing within the organization. Further, control access systems that allow for exceptions to implemented policies increases the complexity of management given a professional needs to separately manage these exceptions specific to each user and/or resource for which they are granted. Thus, management of control access policies may not be practically performed by a human. Where such control access policies are managed by a human (e.g., a professional), however, it may be impossible to consistently maintain such policies for a large number of users and resources, thereby leaving an organization susceptible to attack and/or a data breach.

Beyond management of control access policies, access control policy professionals may also need to determine what type and amount of privileges to allocate to each new user of the access-protected resources. The professional may need to have knowledge about each of the different resources and their impact on an organization if breached, as well as information about the user for which one or more privileges are to be granted, to determine the correct set of privileges to allocate to the user. A professional may not always possess such knowledge; thus, privileges granted to a user may (1) include unnecessary privileges and/or (2) lack privileges the user needs to carry out one or more tasks, which are the responsibility of the user.

Embodiments described herein overcome the aforementioned technical problems and improve upon the state of the art by providing an approach for access control policy management that utilizes embedding, clustering, and/or matrix factorization, and more specifically, non-negative matrix factorization, techniques to (1) identify missing and/ or unnecessary access privileges for users, (2) determine a correct resource access to assign to a new user, and/or (3)

identify user anomalies that represent users with incorrectly assigned resource access and/or users with granted resource exceptions. As such, improved techniques for access control policy management are provided herein to help assure the effectiveness of such policies.

As described in detail below, a first embodiment involves the use of matrix factorization techniques to perform a method for access control policy management to identify anomalies in user resource access and take action to rectify such anomalies. A second embodiment involves the use of matrix factorization, embedding, and clustering techniques for not only identifying user-resource anomalies, but also efficiently identifying exceptions granted for an access control policy implemented for one or more users and resources. A third embodiments involves the use of matrix factorization and embedding techniques to perform a method for assigning resource access to users.

Aspects described herein provide significant technical advantages over conventional solutions, including those described above. For example, aspects described herein provide methods for efficiently identifying user-resource anomalies to improve the effectiveness of access control policies. This technical effect overcomes technical problems of inconsistent, excessive (e.g., includes unnecessary and/or redundant resource access for one or more users), and/or incomplete access control policies when conventional approaches for access control policy management are used. Further, aspects described provide a repeatable and efficient approach for assigning resource access to new users and/or new resources managed by an access control management system. This helps to ensure consistency with regard to access control across similarly-situated users and/or similarly-situated resources.

Brief Introduction to Clustering

Clustering may refer to the task of organizing data into an arbitrary number of clusters (groups) such that data belonging to a cluster tends to be more similar than data outside of the cluster (e.g., and belonging to other clusters). K-means clustering is one clustering method than can thus be used to determine clusters as peer groups. K-means clustering is a centroid-based clustering algorithm, where distances are calculated between like characteristics of different data to determine cluster assignments.

Brief Introduction to Non-Negative Matrix Factorization

Non-negative matrix factorization is a method used to factorize (e.g., decompose) a non-negative matrix (e.g., a matrix where each matrix element is a non-negative number), X, into two smaller matrices, A and B, such that A×B approximates matrix X. This is an unsupervised learning algorithm used to reduce the dimensionality of data into lower-dimensional spaces.

Non-negative matrix factorization iteratively changes the values of matrix A and matrix B such that their product approaches matrix X. This method keeps the structure of the original data intact and makes sure that both the basis and weights are non-negative. Non-negative matrix factorization may be complete when an approximation error converges or a certain number of iterations has been reached, for example.

Non-negative matrix factorization can be applied to the statistical analysis of multivariate data. For example, given a set of multivariate n-dimensional data vectors, the vectors are placed in the columns of an m×n matrix X where m is the number of vectors in the data set. This matrix is then approximately factorized into an m×F matrix A and an F×n matrix B. F may be chosen to be smaller than m and n, such that matrix A and matrix B are smaller than the original matrix X. This results in a compressed version of the original data matrix X.

Access Control Policy Management Using Non-Negative Matrix Factorization and Embeddings As mentioned above, in the first embodiment, matrix factorization techniques are used to perform a method for access control policy management to grant missing resource access and/or remove unnecessary resource access. For example, an m×n matrix X is initially created for m users and n resources (e.g., with m rows corresponding to m users and n columns corresponding to n resources). Each cell in matrix X includes a value indicating whether a user corresponding to the respective cell is denied or granted access to a resource also corresponding to the respective cell. For example, a cell in a first row and a first column of matrix X may correspond to a first user (e.g., based on the first row) and a first resource (e.g., based on the first column). A value in this cell may indicate whether the first user is granted access to the first resource or not (or was historically granted access to the first resource where the user is no longer subject to the access control policy).

Two smaller, lower-dimensional matrices, A and B, are created from matrix X. Matrix A is generated to have m rows corresponding to the m users and F columns, where F is an integer, generally less than m and n. F represents an embedding size selected for the matrix. Matrix B is generated to have F rows and n columns corresponding to the n resources. Rows in matrix A may represent embeddings for the m users, and columns in matrix B may represent embeddings for the n resources. In other words, matrix X is factorized into two smaller matrices, A and B, where A×B approximates matrix X. Matrix A and matrix B may capture meaningful features and patterns, with respect user-resource access, present in matrix X, but in a lower-dimensional space. In other words, because matrix A and B are compressed versions of matrix X, less than all patterns and features of matrix X may be captured in these matrices.

Matrix A and matrix B are then multiplied to create a reconstructed version of matrix X. The reconstructed version of matrix X may be an approximation of matrix X. A value of each cell in matrix X is then compared with a value of a corresponding cell in the reconstructed version of matrix X. Corresponding cells with values different by greater than a threshold are identified as user-resource anomalies. In other words, these cells may represent users with access privileges greater and/or less than what is expected for the particular users. For a user missing one or more access privileges, the system may be configured to grant the user such missing privileges and/or report the user to an access-control policy management professional (e.g., such that further corrective action is taken by the professional). Similarly, for a user having one or more additional privileges than what is expected for the user, the system may be configured to further restrict access of the user such that these additional privilege(s) are revoked and/or report the user to an access-control policy management professional.

In the second embodiment, to identify user-resource anomalies, matrix factorization, embedding, and clustering techniques are utilized by the access control management system. For example, a first set of embeddings, e.g., a plurality of user access embeddings, is extracted from matrix A created using matrix factorization techniques, as described above. Each user access embedding is associated with a particular user and includes information about resource access for the user. Further, a second set of embeddings, e.g., user attribute embeddings, are created for a plurality of users managed by the access control management system based on user attributes associated with these users (e.g., roles in organization, managers in organization, departments users are assigned to, etc.). A first clustering operation may be applied to the first set of embeddings to group each of the first set of embeddings into one or more first clusters, and a second clustering operation may be applied to the second set of embeddings to group each of the second set of embeddings into one or more second clusters. The first and/or second clustering operations may involve performing a K-means clustering operation.

User access embeddings grouped into a same first cluster may correspond to users with similar attributes (e.g., similar resource access is expected to be granted to similarly-situated users). Further, user attribute embeddings belonging to a same second cluster may also correspond to users with similar attributes. Thus, a first cluster may be expected to include user access embeddings corresponding to the same users which are also users associated with user attribute embeddings all within in a second cluster (e.g., the clusters are expected to contain embeddings for the same users). However, this may not always be the case.

For example, a user working a managerial role in an IT department may be clustered with other users also working in a managerial role in the IT department (e.g., based on their user attribute embeddings). These users may be expected to have similar resource access, and thus, also be grouped with the same users in another cluster created based on their corresponding user access embeddings. One of these users, however, may have been granted additional resource access (e.g., additional privileges) a few months prior due to the user's involvement in a high profile matter. Thus, a first cluster (e.g., created based on user access embeddings) that the user belongs to may be associated with a different set of users than a second cluster (e.g., created based on user attribute embeddings) that the user also belongs to. Aspects described herein provide techniques for making this comparison to identify such user-resource anomalies, such that they may be corrected where necessary (e.g., revoke previously-granted privileges for the user, make access control for the user less/more strict, etc.).

In a third embodiment, embedding techniques are used to determine a correct amount and/or type of access control to grant to a new user managed by the access control management system. In particular, the system is configured to grant access to one or more resources based on the resource access of a similarly-situated user (e.g., currently or previously managed by the system). For example, to identify the similarly-situated user and thus assign access control to the new user, the system is configured to create a user embedding for the new user based on user attributes associated with the new user. This new user embedding is then compared with user embeddings created for users managed by the system to identify a closest user embedding to the new user embedding. The closest user embedding may correspond to a user (e.g., currently or previously managed by the system) most similar to the user (e.g., same role, same manager, same department, etc.). The system may grant the new user similar resource access (e.g., grant the new user similar privileges, assuming default privilege assigned to new users includes no privileges at all) as the resource access granted to the identified user. For example, if the identified user is able to access resources 1-10 in the system, then the new user may also be granted access to resources 1-10 (e.g., given privileges to access resources 1-10).

Similar embedding techniques may also be used to determine access control to a new resource added that is to be managed by the system. However, instead of comparing an embedding for the new resource to user embeddings corresponding to users managed by the system, the embedding for the new resource is compared to resource embeddings corresponding to resources managed by the system to identify a closest resource embedding for a resource most similar to the new resource and grant user(s) access to the new resource based on user access granted to the resource.

Example Access Control Management System Used for Managing User Resource Access

FIGS. 1A-1C depict an example access control management system 100 (simply referred to herein as "system 100") configured to manage user access to one or more resources managed by system 100. Managing user access to resource(s) may include identifying resource access that a user is entitled but has not been previously granted to the user (e.g., missing access privilege(s)), identifying unnecessary resource access previously given to a user that the user does not need (e.g., unnecessary access privilege(s)), and/or taking corrective action to grant additional access and/or revoke access of a user to one or more resources managed by system 100. To carry out these tasks, system 100 includes an instance generation component 102, a matrix generation component 104, a matrix factorization component 106, a matrix reconstruction component 108, and a matrix comparison component 110, as shown in FIG. 1A. Matrix comparison component 110 includes a cell comparison component 114, an anomaly detection component 116, and an action component 118, as further shown in FIG. 1A.

FIGS. 1B and 1C provide additional details about each of these components illustrated in FIG. 1A, including their inputs and outputs. As such, FIGS. 1A, 1B, and 1C are described in conjunction below.

As shown in FIG. 1B, instance generation component 102 (introduced in system 100 of FIG. 1A) creates instances 134 for users with resource access managed by system 100. Each instance 134 includes information about a particular user, a particular resource managed by system 100, and whether the particular user was previously denied or granted access to the particular resource. The user associated with each instance 134 may be identified in the instance 134 by a user identifier (ID) assigned to the user. Similarly, a resource associated with each instance 134 may be identified in the instance 134 by a resource ID assigned to the resource. In particular, an instance 134 may include concatenated information such as "User ID|Resource ID|Access (Y/N)." For example, an instance 134 for user "John Smith" associated with user ID 1 that has been granted access to a file in a database associated with resource ID 1 may be "User ID 1|Resource ID 1|Y." A number of instances 134 created by instance generation component 102 may be based on a number of users (m) and a number of resources (n) managed by system 100. For example, in case where system 100 manages 1,000 users and 2,000 resources, instance generation component 102 creates 2 million instances 134 (e.g., 1,000 users×2,000 resources=2 million instances).

Matrix generation component 104, shown in FIGS. 1A and 1B, uses instances 134, created by instance generation component 102, to generate an access matrix (e.g., an example of a "data element"), such as access matrix 136 shown in FIG. 1B. Access matrix 136 is a two-dimensional array of cells, where each cell corresponds to a user and a resource of a particular instance 134. In some cases, access matrix 136, as shown in FIG. 1B, includes a plurality of rows corresponding to the users (m) of instances 134 (e.g., shown in FIG. 1B as users U1 through U(m)) and a plurality of columns corresponding to the resources (n) of instances 134 (e.g., shown in FIG. 1B as resources R1 through R (n)). In particular, access matrix 136 may be an m×n matrix with a number of rows equal to the number of users (m) and a number of columns equal to a number of resources (n) (or vice versa, where the matrix is transposed). Each cell in access matrix 136 includes a value indicating whether a user corresponding to the respective cell was previously denied or granted access to a resource corresponding to the respective cell. For example, cell 135 may indicate that user U1 has access to resource R1, or alternatively, that user U1 does not have access to resource R1. In some cases, access matrix 136 is a co-occurrence matrix (e.g., a two-dimensional array of cells where, for example, each cell corresponds to a user and a resource). A co-occurrence matrix may be normalized such that counts are replaced with probabilities.

Matrix factorization component 106, shown in FIGS. 1A and 1B, uses access matrix 136, generated by matrix generation component 104, to create two lower-dimensionality matrices (e.g., example of "data sub-elements"), namely a user feature matrix and a resource feature matrix, such as user feature matrix 138 and resource feature matrix 140, respectively, shown in FIG. 1B. For example, matrix factorization component 106 factorizes access matrix 136 into user feature matrix 138 and resource feature matrix 140, such that the product of user feature matrix 138 and resource feature matrix 140 is an approximation of access matrix 136.

User feature matrix 138 includes a plurality of rows corresponding to the users (m) (e.g., shown in FIG. 1B as users U1 through U(m)) and a plurality of columns corresponding to the features (F) (e.g., shown in FIG. 1B as features F1 through F(Z)) (or vice versa). In particular, user feature matrix 138 is an m×F matrix with a number of rows equal to the number of users (m) and a number of columns equal to a number of features (Z).

Resource feature matrix 140 includes a plurality of rows corresponding to the features (F) (e.g., shown in FIG. 1B as features F1 through F(Z)) and a plurality of columns corresponding to the resources (n) (e.g., shown in FIG. 1B as users R1 through R (n)) (or vice versa). In particular, resource feature matrix 140 is an F×n matrix with a number of rows equal to the number of features (Z) and a number of columns equal to a number of resources (n).

F represents an embedding size selected for the matrix. F may be chosen to be smaller than a number of users (m) and a number of resources (n), such that user feature matrix 138 and resource feature matrix 140 are smaller than access matrix 136. This results in compressed versions of the original access matrix 136.

Matrix reconstruction component 108, shown in FIGS. 1A and 1B, uses user feature matrix 138 and resource feature matrix 140, generated by matrix factorization component 106, to create a reconstructed representation of access matrix 142 (simply referred to herein as "reconstructed matrix 142"). For example, matrix reconstruction component 108 multiplies user feature matrix 138 with resource feature matrix 140 to generate reconstructed matrix 142. By multiplying user feature matrix 138 (m×Z) and resource feature matrix 140 (Z×n) together, the original dimensionality of access matrix 136 (mx n) may be recovered. Reconstructed matrix 142 may be an approximation of access matrix 136. In particular, user feature matrix 138 and resource feature matrix 140 capture meaningful features and patterns of access matrix 136. Thus, the product of user feature matrix 138 and resource feature matrix 140 may capture many of the patterns and features of access matrix 136 (but may not capture anomalies/exceptions present in access matrix 136).

Matrix comparison component 110, shown in FIG. 1A, compares cells of access matrix 136 to corresponding cells in reconstructed matrix 142 to identify one or more user-resource anomalies. In particular, because reconstructed matrix 142 is an approximation of access matrix 136 used to represent meaningful features and patterns present in access matrix 136, reconstructed matrix 142 may not capture values (e.g., anomalies, exceptions, etc.) in access matrix 136 which differ from patterns identified in access matrix. In other words, the direct comparison of access matrix 136 and reconstructed matrix 142, e.g., by a difference operation or other quantitative comparison between the matrices, beneficially identifies anomalous values that are not characterized through the characterization process. Thus, the factorization process acts as an automatic filter of normal versus anomalous without having prior knowledge or using expert knowledge. Further, comparison of the matrices is more computationally efficient that comparing each user's resource access to resource access of other users (e.g., in some cases, one resource at a time) managed by system 100 to detect anomalies, especially in cases where an enormous number of users and resources exist.

For example, reconstructed matrix 142 may replicate a prominent user-resource pattern present in access matrix 136 for multiple users and resources, but may not capture a one-off case where a user was previously granted access to an additional resource, as an exception to an access control policy managed by system 100. Accordingly, a value of a cell in access matrix 136 corresponding to this user and resource may be different than a value of a corresponding cell in reconstructed matrix 142. The difference in these cell values may be used by system 100 to identify whether the user and/or resource corresponding to these cells is an anomaly. For example, if an absolute value of a difference between the value of the cell in access matrix 136 and the value of the cell in reconstructed matrix 142 is greater than a threshold, then system 100 may determine that the user and/or resource corresponding to these cells is an anomaly.

Such matrix comparison for anomaly detection is performed by cell comparison component 114, anomaly detection component 116, and action component 118 shown in FIGS. 1A and 1C.

Cell comparison component 114 compares cells in access matrix 136 to cells in reconstructed matrix 142. In some cases, cell comparison component 114 performs this comparison by calculating an absolute value of a difference between a value of a cell in access matrix 136 and a value of a corresponding cell in reconstructed matrix 142. For example, a first cell in access matrix 136, cell 1, associated with user U1 and resource R1 corresponds to a second cell in reconstructed matrix 142, cell 2, also associated with user U1 and resource R1. Cell 1 in access matrix 136 includes "Value1" while cell 1 in reconstructed matrix 142 includes "Value 2." Thus, to perform a comparison, cell comparison component 114 may calculate an absolute value difference between Value1 and Value2 (e.g., $|(Value1-Value2|)$.

Anomaly detection component 116 determines whether the comparison indicates that the cells correspond to a user and/or resource anomaly. More specifically, in the example, anomaly detection component 116 determines whether the cell 1 in access matrix 136 and cell 2 in reconstructed matrix 142 correspond to a user and/or resource anomaly by comparing the calculated absolute value to a threshold (e.g., such as 0.8). If the absolute value is determined to be above the threshold (e.g., |(Value1−Value2|≥Threshold), then anomaly detection component 116 determines that the cells are likely representative of an anomaly present in the matrices.

As shown in FIG. 1A, if anomaly detection component 116 detects an anomaly, then action component 118 performs one or more actions (e.g., based on this detection).

In some cases, the identified anomaly indicates that the resource (R1) corresponding to cell 1 in access matrix 136 and cell 2 in reconstructed matrix 142 is a resource for which a user corresponding to the cells (U1) is missing access permission. In other words, the user (U1) should have been granted access to resource (R1) and for some reason, was never granted such access. In this case, the action(s) performed by action component 118 may include granting the user (U1) access to the resource (R1).

In some cases, the identified anomaly indicates that the resource (R1) corresponding to cell 1 in access matrix 136 and cell 2 in reconstructed matrix 142 is a resource for which a user corresponding to the cells (U1) is granted unnecessary access permission. In other words, the user (U1) should not have access to resource (R1) and for some reason, was previously granted this access. In this case, the action(s) performed by action component 118 may include revoking the user's (U1) access to the resource (R1).

In some cases, one or more actions performed by action component 118 include reporting the user (U1) and resource (R1) corresponding to the anomaly, such that corrective action may be performed, where necessary. In some cases, no action may be taken based on the reported user (U1) and resource (R1), for example, where the resource access for this user and resource is meant to be an exception to an access control policy managed by system 100.

As shown in FIG. 1A, if anomaly detection component 116 does not detect an anomaly, then no further action is taken.

Operations performed by components of system 100, as described above, may be performed one or more times to manage user access to resource(s) managed by system 100. For example, the operations may again be performed after a period of time has passed and/or after resource(s) and/or user(s) managed by system 100 have changed.

Figure 2A:
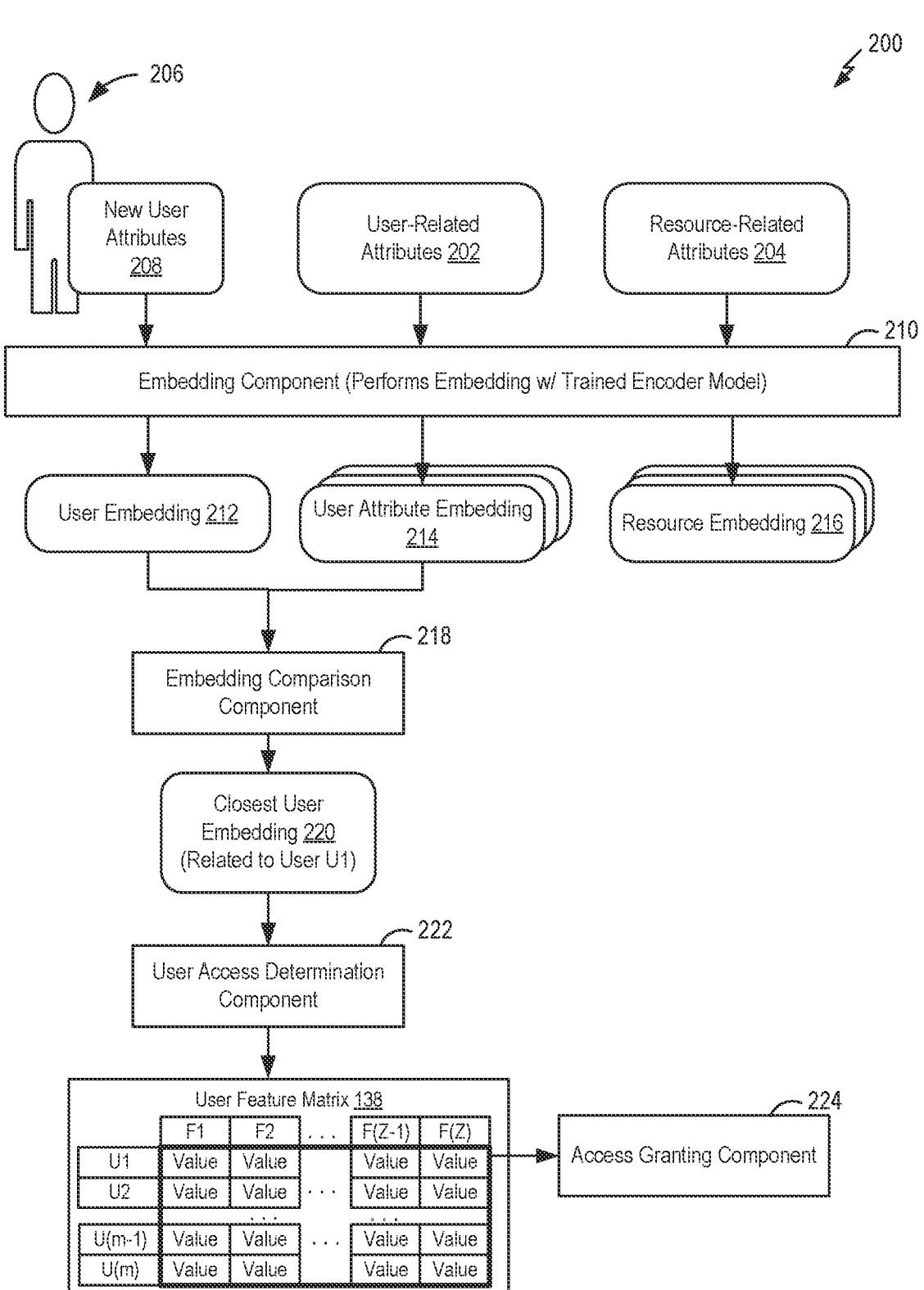
FIG. 2A depicts an example access control management system configured to assign resource access to a new user.

Example Access Control Management System Used for Assigning Resource Access to a User FIG. 2A depicts an example access control management system 200 (simply referred to herein as "system 200") configured to assign resource access to a new user. Resource accesses assigned to a new user by system 200 may be based on resource accesses granted to one or more other similarly-situated users managed by system 200 (e.g., current and historical users). For example, a new user managed by system 200 may be assigned resource accesses consistent with another user that has the same role, same manager, works in the same office, and/or the like as the new user. Assigning similar resource accesses to similar users provides an efficient way for determining resource accesses without needing to determine whether the new user is to be granted accesses to each resource one-by-one, including in some cases determining the level of access for various resources.

To carry out this resource assignment, system 200 includes an embedding component 210, an embedding comparison component 218, a user access determination component 222, and an access granting component 224. Further, system 200 may use embeddings in user feature matrix generated for users managed by system 200, such as user feature matrix 138, generated by matrix factorization component 106 in FIGS. 1A and 1B based on resource access for multiple users, to carry out this resource assignment.

After determining that a new user 206 is to be added to a set of users managed by system 200, embedding component 210 creates a user embedding 212 for new user 206. For example, embedding component 210 creates user embedding 212 for new user 206, using a trained encoder model, based on a plurality of attributes associated with new user 206 (e.g., new user attributes 208). User embedding 212 may have a lower dimensionality than new user attributes 208.

Attributes associated with new user 206 and used to create user embedding 212 may include information about a role of new user 206 in an organization, a level of new user 206 in the organization, a department where new user 206 is working in the organization, a manager of new user 206, an office location where new user 206 is assigned, and/or the like.

In addition to creating the user embedding for new user 206, embedding component 210 further creates multiple user attribute embeddings 214 for users managed by system 200. Again, embedding component 210 may create user attribute embeddings 214, using the trained encoder model, based on user-related attributes 202 associated with users managed by system 200. User-related attributes 202 may include similar attribute types as new user attributes 208. Alternatively, embedding component 210 obtains user attribute embeddings 214, where such embeddings were previously generated by embedding component 210 or another component and store for use by, at least, and embedding component 210.

Embedding comparison component 218 compares user embedding 212, created for new user 206, to each user attribute embedding 214 to determine a closest user embedding 220. In particular, the comparison is used to determine a relatedness and/or similarity of user embedding 212 to user attribute embeddings 214 created for users managed by system 200. In some embodiments, the comparison is performed by determining a distance metric between two embeddings (e.g., two vector embeddings). The distance metric may be calculated, for example, as a Euclidean distance or as cosine similarity metric. A small distance metric calculated between user embedding 212 and a user attribute embedding 214 may indicate that the embeddings are likely related, and thus that the user corresponding to the user attribute embedding 214 is similar to new user 206 (e.g., hold similar roles in an organization, are at similar levels in the organization, are assigned to a same office location, etc.). Alternatively, a large distance metric calculated between user embedding 212 and a user attribute embedding 214 may indicate that the embeddings are likely not related, and thus that the user corresponding to the user attribute embedding 214 is not similar to new user 206 (e.g., hold different roles in an organization, are not at similar levels in the organization, are assigned to different office locations, etc.). Thus, closest user embedding 220, determined by embedding comparison component 218, is associated with a user most similar to new user 206.

User access determination component 222 uses closest user embedding 220 to determine resource access that is to be granted to new user 206. For example, user access determination component 222 identifies a user associated with closest user embedding 220, and locates the user in a user feature matrix. For example, the user feature matrix may be user feature matrix 138, generated by matrix factorization component 106 in FIGS. 1A and 1B based on resource access for users managed by system 200. Locating the user in user feature matrix 138 may indicate the resource access granted to the user (per user feature matrix 138). For instance, assuming the identified user is user U1, then values in the first row in user feature matrix 138, corresponding to resources R1 through R (n), are used to determine the resource access that is to be granted to new user 206.

Access granting component 224 grants new user 206 similar resource access as the user corresponding to closest user embedding 220. For example, where the user (U1) corresponding to closest user embedding 220, has access to, and is capable of performing any actions on (e.g., read, write, etc.), resources R1-R3 only, then user 206 may also be granted full access and privileges to resources R1-R3, without granting access and/or privileges to other resources.

In some embodiments, access granting component 224 makes a recommendation to grant new user 206 the resource access of the user corresponding to closest user embedding 220. Based on approval of this recommendation, access granting component 224 may proceed with granting such access to new user 206.

Figure 2B:
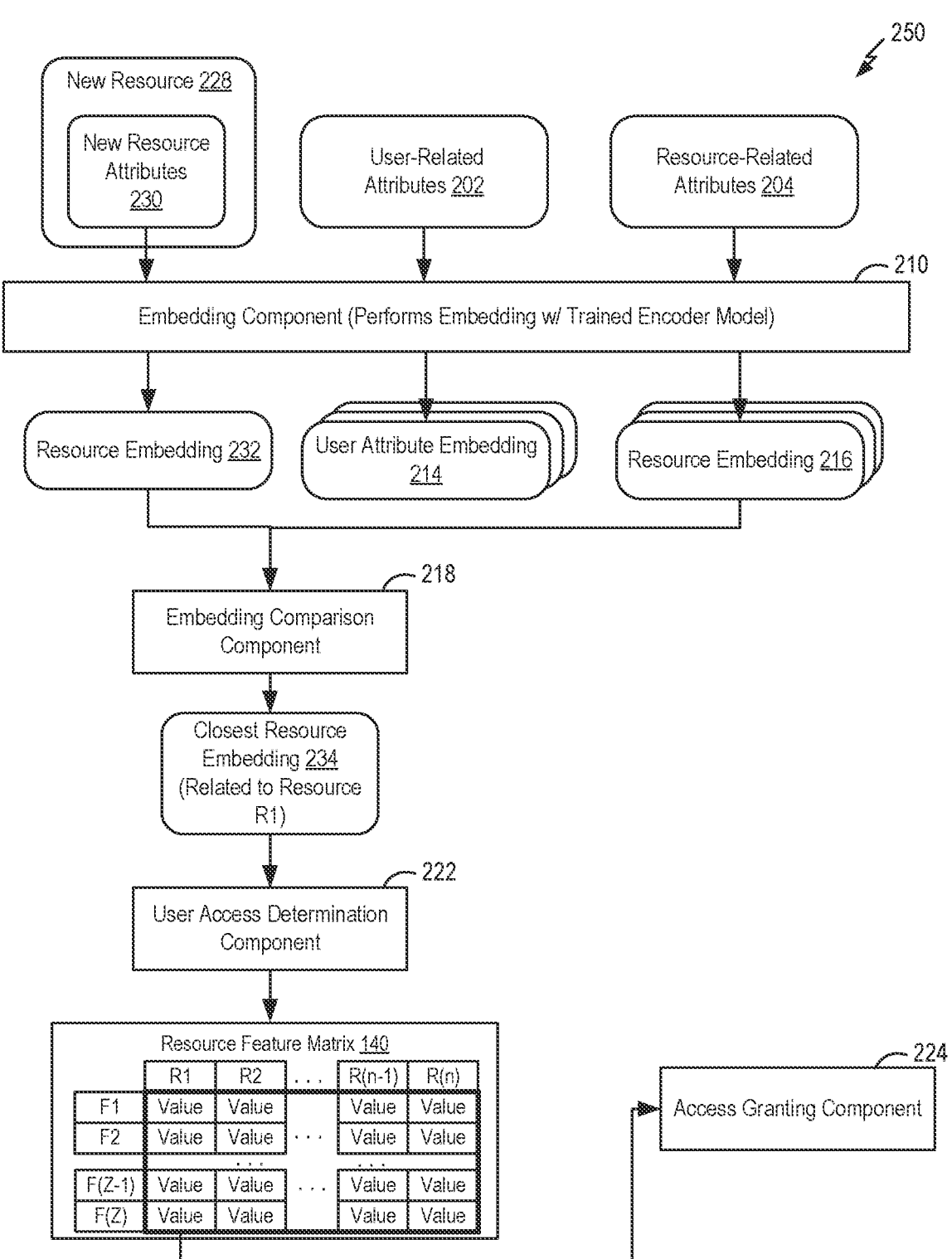
FIG. 2B depicts an example access control management system configured to assign one or more users access to a resource managed by the system.

FIG. 2B depicts an example access control management system 250 (simply referred to herein as "system 250") configured to assign one or more users access to a new resource managed by system 250. System 250 includes similar components as system 200; however, the components are used to assign user access to a new resource rather than assigning resource access to a new user. In particular, similar to system 200, system 250 includes an embedding component 210, an embedding comparison component 218, a user access determination component 222, and an access granting component 224. Further, system 250 may use embeddings in a resource feature matrix, such as resource feature matrix 140 generated by matrix factorization component 106 in FIGS. 1A and 1B based on resource access for multiple users, to assign one or more users access to a resource managed by system 250.

After determining that a new resource 228 is to be added to a listing of resources managed by system 250, embedding component 210 creates a resource embedding 232 for new resource 228. For example, embedding component 210 creates resource embedding 232 for new resource 228, using a trained encoder model, based on a plurality of attributes associated with new resource 228 (e.g., new resource attributes 230). Resource embedding 232 may have a lower dimensionality than new resource attributes 230.

Attributes associated with new resource 228 and used to create resource embedding 232 may include information about a bucket (e.g., a cloud storage container) where new resource 228 is stored, a table associated with new resource 228 that organizes information about storage locations of different resources including new resources 228, a schema associated with new resource 228 (e.g., an organization or a structure of a database where new resource 228 is stored), a database where new resource 228 is stored, and/or the like.

In addition to creating resource embedding 232 for new resource 228, embedding component 210 further creates multiple resource embeddings 216 (or obtains previously-created resource embeddings 216) for resources managed by system 250 (e.g., currently and historically managed resources). Again, embedding component 210 may create resource embeddings 216, using the trained encoder model, based on resource-related attributes 204 associated with resources managed by system 250. Resource-related attributes 204 may include similar attribute types as new resource attributes 230.

Embedding comparison component 218 compares resource embedding 232, created for new resource 228, to each resource embedding 216 to determine a closest resource embedding 234. In particular, the comparison is used to determine a relatedness and/or similarity of resource embedding 232 to resource embeddings 216 created for resources managed by system 250. In some embodiments, the comparison is performed by determining a distance metric between two embeddings (e.g., two vector embeddings). The distance metric may be calculated, for example, as a Euclidean distance or as cosine similarity metric. A small distance metric calculated between resource embedding 232 and a resource embedding 216 may indicate that the embeddings are likely related, and thus that the resource corresponding to the resource embedding 216 is similar to new resource 228 (e.g., belong to similar buckets, are stored in similar databases, etc.). Alternatively, a large distance metric calculated between resource embedding 232 and a resource embedding 216 may indicate that the embeddings are likely not related, and thus that the resource corresponding to the resource embedding 216 is not similar to new resource 228 (e.g., belong to different buckets, are stored in different databases, etc.). Thus, closest resource embedding 234, determined by embedding comparison component 218, is associated with a resource most similar to new resource 228.

User access determination component 222 uses closest resource embedding 234 to determine user access that is to be granted to new resource 228. For example, user access determination component 222 identifies a resource associated with closest resource embedding 234, and locates the resource in a resource feature matrix. For example, the resource feature matrix may be resource feature matrix 140, generated by matrix factorization component 106 in FIGS. 1A and 1B based on user access for multiple resources. Locating the resource in access matrix 136 may indicate the user(s) granted access to the resource (per resource feature matrix 140). For instance, assuming the identified resource is resource R1, then values in the first column in access matrix 136, corresponding to users U1 through U(m), are used to determine the user access that is to be granted to new resource 228.

Access granting component 224 grants new resource 228 similar user access as the resource corresponding to closest resource embedding 234. For example, where only users U1-U3 are granted access to resource (R1) corresponding to closest resource embedding 234, then only users U1-U3 may be granted access to new resource 228.

Figure 3A:
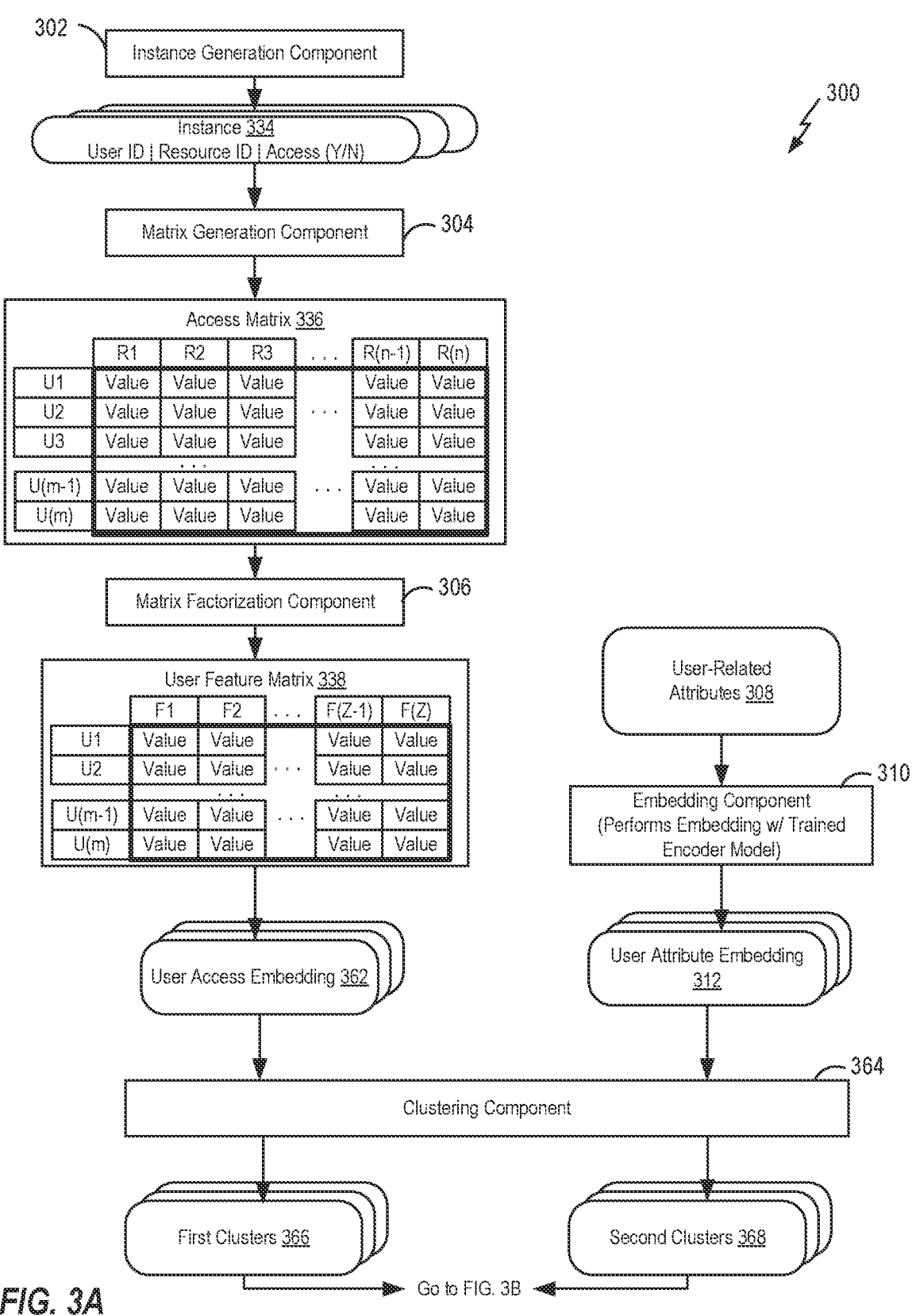
FIGS. 3A-3B depict an example access control management system configured to manage one or more access control policies.
Figure 3B:
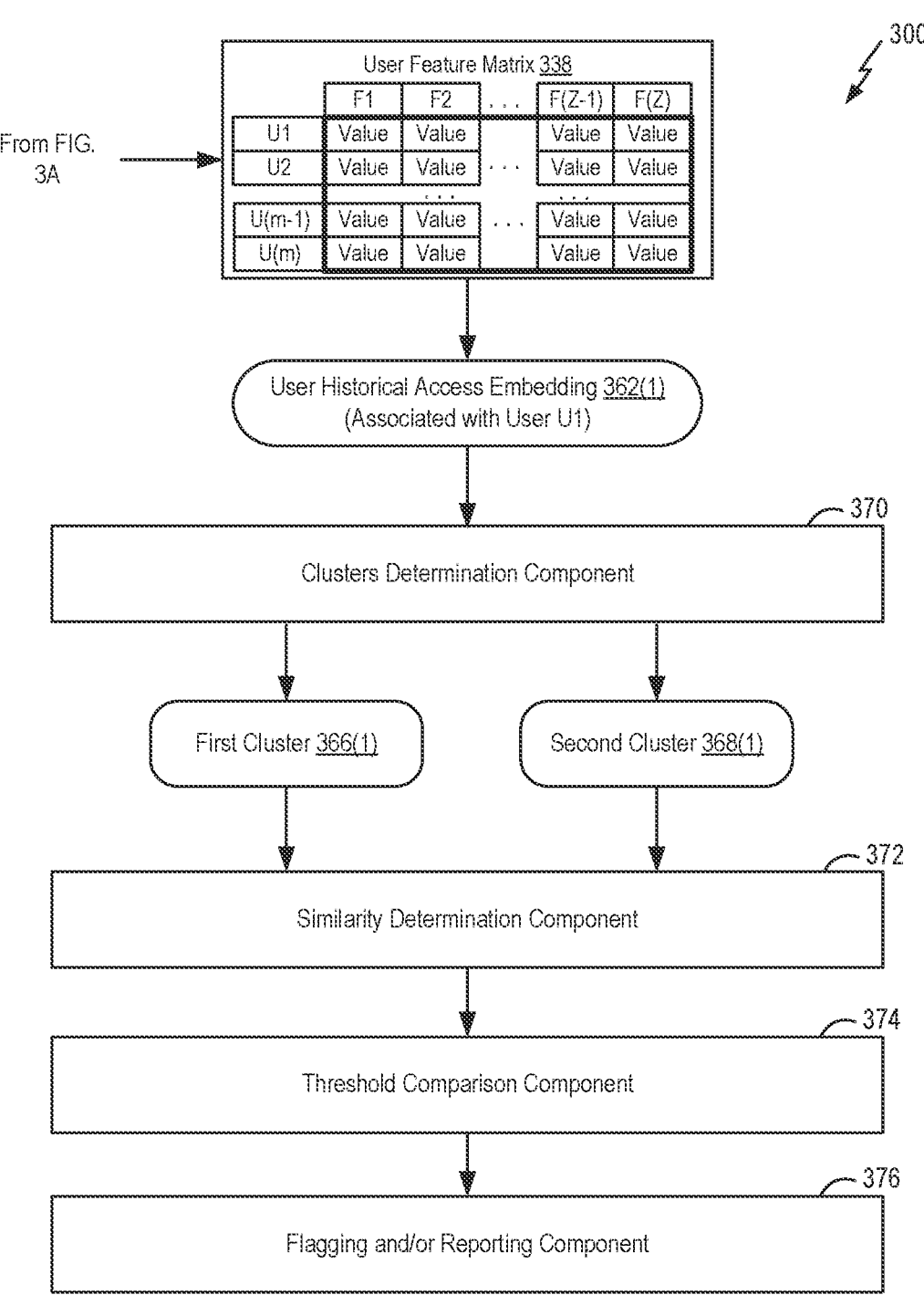

Example Access Control Management System Used to Manage One or More Access Control Policies FIGS. 3A-3B depict an example access control management system 300 (simply referred to herein as "system 300") configured to manage one or more access control policies. More specifically, access control management system 300 is configured to identify user resource access anomalies (e.g., user(s) with resource control access different than what is expected for the user) using matrix factorization, embedding, and clustering techniques.

To identify such anomalies, system 300 includes an instance generation component 302, a matrix generation component 304, and a matrix factorization component 306 (e.g., similar to instance generation component 102, a matrix generation component 104, and matrix factorization component 106, respectively, illustrated in system 100 of FIG. 1A). In system 300 of FIGS. 3A-3B, these components are used to generate a plurality of instances 334, create an access matrix 336 based on the plurality of instances 334, and factorize access matrix 336 into at least user feature matrix 338. However, in FIG. 3, each row in user feature matrix 338 is extracted to represent a user access embedding 362.

Further, system 300 includes an embedding component 310, similar to embedding component 210 illustrated in system 200 of FIG. 2A. Similar to system 200 of FIG. 2A, in system 300 of FIGS. 3A-3B, embedding component 310 is used to generate a plurality of user attribute embeddings 312 based on user-related attributes 308.

Unlike both system 100 and system 200, system 300 additionally includes a clustering component 364, a clusters determination component 370, a similarity determination component 372, a threshold comparison component 374, and a flagging and/or reporting component 376.

Clustering component 364, shown in FIG. 3A, performs clustering operations on user access embeddings 362 and, separately, user attribute embeddings 312. For example, clustering component 364 performs a first clustering operation to group the user access embeddings 362 into one or more first clusters 366. Additionally, clustering component 364 performs a second clustering operation to group the user attribute embeddings 312 into one or more second clusters 368. In some cases, the first clustering operation and/or the second cluster operation is a K-means clustering operation used to group similar embeddings into a same cluster.

Clusters determination component 370, shown in FIG. 3B, then selects a user access embedding from user feature matrix 338, such as user access embedding 362(1) associated with user U1 in user feature matrix 338, and identifies a first cluster 366(1), among the one or more first clusters 366, that contains the selected user access embedding 362(1). Additionally, clusters determination component 370 identifies a second cluster 368(1), among the one or more second clusters 368, as the cluster that contains a user attribute embedding 312 associated with user U1.

Similarity determination component 372 determines a similarity between first cluster 366(1) and second cluster 368(1). In certain embodiments, the similarity between the first cluster and the second cluster is calculated as a Jaccard index value. A Jaccard index value, also commonly referred to as a Jaccard similarity coefficient, is a measure of the similarity between two sets of data, and in this case, between embeddings belonging to two different clusters.

In some aspects, to avoid arbitrary assignments, multiple rounds of clustering with different parameters (e.g., with various K-values where K-means clustering is used) are performed by clustering component 364. Thus, the similarity determined by similarity determination component 372 may be an average similarity score between a first cluster 366 and a second cluster 368 containing an embedding corresponding to user U1 in each clustering round.

Threshold comparison component 374 determines whether the similarity between first cluster 366(1) and second cluster 368(1) is below a threshold (e.g., a predefined threshold).

Flagging and/or reporting component 376 may be used to flag and/or report the identity of the user (e.g., user U1) if the determined similarity is below the threshold.

Example Method for Computationally Efficient Anomaly Detection

FIG. 4 depicts an example method 400 for computationally efficient anomaly detection. Method 400 may be performed by one or more processor(s) of a computing device, such as processor(s) 802 of processing system 800 described below with respect FIG. 8.

Method 400 begins, at step 402, with factorizing a user access co-occurrence data element to generate two data sub-elements. The user access co-occurrence data element represents co-occurrences between users of a system and resources of the system. A product of the two data sub-elements approximates the user access co-occurrence data element. Further, each of the two data sub-elements has reduced dimensionality compared to the user access co-occurrence data element.

Method 400 proceeds, at step 404, with generating an approximated user access co-occurrence data element based on the product of the two data sub-elements.

Method 400 proceeds, at step 406, with comparing the user access co-occurrence data element and the approximated user access co-occurrence data element to determine one or more anomalies, wherein each of the one or more anomalies relates to access for a user to a resource of the system.

Method 400 proceeds, at step 408, with taking one or more actions to rectify the one or more anomalies.

Note that FIG. 4 is just one example of a method, and other methods including fewer, additional, or alternative steps are possible consistent with this disclosure.

Example Method for Assigning Access Rights to Resources of a System

FIG. 5 depicts an example method 500 for assigning access rights to resources of a system. Method 500 may be performed by one or more processor(s) of a computing device, such as processor(s) 802 of processing system 800 described below with respect FIG. 8.

Method 500 begins, at step 502, with creating a new user attribute embedding for a new user of the system.

Method 500 proceeds, at step 504, with comparing the new user attribute embedding to user attribute embeddings created for users of the system to determine a closest user attribute embedding associated with a closest user of the system.

Method 500 proceeds, at step 506, with configuring access rights to one or more of the resources of the system for the new user based on one or more access rights associated with the closest user.

Note that FIG. 5 is just one example of a method, and other methods including fewer, additional, or alternative steps are possible consistent with this disclosure

Example Method for Assigning Access Rights to Users of a System

FIG. 6 depicts an example method for assigning access rights to users of a system. Method 600 may be performed by one or more processor(s) of a computing device, such as processor(s) 802 of processing system 800 described below with respect FIG. 8.

Method 600 begins, at step 602, with creating a new resource attribute embedding for a new resource of the system.

Method 600 proceeds, at step 604, with comparing the new resource attribute embedding to resource attribute embeddings created for resources of the system to determine a closest resource attribute embedding associated with a closest resource of the system.

Method 600 proceeds, at step 606, with configuring access rights to one or more of the users of the system for the new resource based on one or more access rights associated with the closest resource.

Note that FIG. 6 is just one example of a method, and other methods including fewer, additional, or alternative steps are possible consistent with this disclosure.

Example Method for Access Rights Management

FIG. 7 depicts an example method for access rights management. Method 700 may be performed by one or more processor(s) of a computing device, such as processor(s) 802 of processing system 800 described below with respect FIG. 8.

Method 700 begins, at step 702, with factorizing a user access co-occurrence data element to generate two data sub-elements. The user access co-occurrence data element may represent co-occurrences between users of a system and resources of the system. A product of the two data sub-elements may approximate the user access co-occurrence data element. Each of the two data sub-elements may have reduced dimensionality compared to the user access co-occurrence data element. One of the two data sub-elements may include user access embeddings associated with the users of the system.

Method 700 proceeds, at step 704, with clustering the user access embeddings associated with the users of the system into one or more first clusters.

Method 700 proceeds, at step 706, with creating, for each respective user of the system, a user attribute embedding based on a plurality of attributes of the respective user.

Method 700 proceeds, at step 708, with clustering the user attribute embeddings created for the users of the system into one or more second clusters.

Method 700 proceeds, at step 710, with performing steps 712-720 for at least one of the user access embeddings.

In particular, at step 712, method 700 includes determining a first cluster of the one or more first clusters comprising a first user access embedding.

At step 714, method 700 includes determining a second cluster of the one or more first clusters comprising a user attribute embedding associated with a user corresponding to the respective user access embedding.

At step 716, method 700 includes determining a similarity between the first cluster and the second cluster.

At step 718, method 700 includes determining the similarity is below a threshold.

At step 720, method 700 includes flagging the user based on the similarity being below the threshold.

Note that FIG. 7 is just one example of a method, and other methods including fewer, additional, or alternative steps are possible consistent with this disclosure.

Example Processing System for Access Control Policy Management

Figure 8:
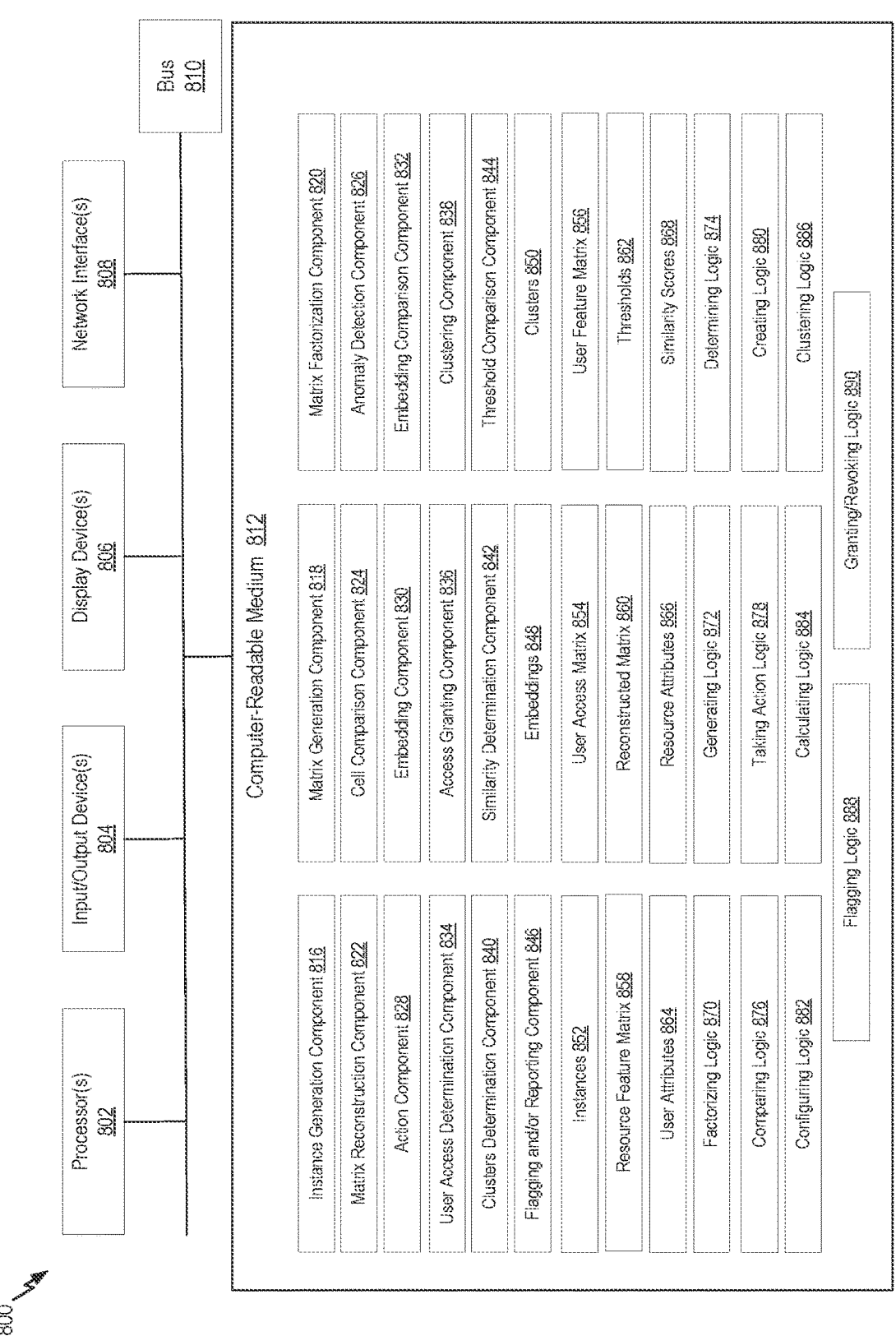
FIG. 8 depicts an example processing system with which aspects of the present disclosure can be performed.

FIG. 8 depicts an example processing system 800 configured to perform various aspects described herein, including, for example, method 400 as described above with respect to FIG. 4, method 500 as described above with respect to FIG. 5, method 600 as described above with respect to FIG. 6, and method 700 as described above with respect to FIG. 7.

Processing system 800 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 800 includes one or more processors 802, one or more input/output devices 804, one or more display devices 806, one or more network interfaces 808 through which processing system 800 is connected to one or more networks (e.g., a local network, an intranet, the Internet, or any other group of processing systems communicatively connected to each other), and computer-readable medium 812. In the depicted example, the aforementioned components are coupled by a bus 810, which may generally be configured for data exchange amongst the components. Bus 810 may be representative of multiple buses, while only one is depicted for simplicity.

Processor(s) 802 are generally configured to retrieve and execute instructions stored in one or more memories, including local memories like computer-readable medium 812, as well as remote memories and data stores. Similarly, processor(s) 802 are configured to store application data residing in local memories like the computer-readable medium 812, as well as remote memories and data stores. More generally, bus 810 is configured to transmit programming instructions and application data among the processor(s) 802, display device(s) 806, network interface(s) 808, and/or computer-readable medium 812. In certain embodiments, processor(s) 802 are representative of a one or more central processing units (CPUs), graphics processing unit (GPUs), tensor processing unit (TPUs), accelerators, and other processing devices.

Input/output device(s) 804 may include any device, mechanism, system, interactive display, and/or various other hardware and software components for communicating information between processing system 800 and a user of processing system 800. For example, input/output device(s) 804 may include input hardware, such as a keyboard, touch screen, button, microphone, speaker, and/or other device for receiving inputs from the user and sending outputs to the user.

Display device(s) 806 may generally include any sort of device configured to display data, information, graphics, user interface elements, and the like to a user. For example, display device(s) 806 may include internal and external displays such as an internal display of a tablet computer or an external display for a server computer or a projector. Display device(s) 806 may further include displays for devices, such as augmented, virtual, and/or extended reality devices. In various embodiments, display device(s) 806 may be configured to display a graphical user interface.

Network interface(s) 808 provide processing system 800 with access to external networks and thereby to external processing systems. Network interface(s) 808 can generally be any hardware and/or software capable of transmitting and/or receiving data via a wired or wireless network connection. Accordingly, network interface(s) 808 can include a communication transceiver for sending and/or receiving any wired and/or wireless communication.

Computer-readable medium 812 may be a volatile memory, such as a random access memory (RAM), or a nonvolatile memory, such as nonvolatile random access memory (NVRAM), or the like. In this example, computer-readable medium 812 includes instance generation component 816, matrix generation component 818, matrix factorization component 820, matrix reconstruction component 822, cell comparison component 824, anomaly detection component 826, action component 828, embedding component 830, embedding comparison component 832, user access determination component 834, access granting component 836, clustering operation component 838, clusters determination component 840, similarity determination component 842, threshold comparison component 844, flagging and/or reporting component 846, embeddings 848, cluster 850, instances 852, user access matrix 854, user feature matrix 856, resource feature matrix 858, reconstructed matrix 860, thresholds 862, user attributes 864, resource attributes 866, similarity scores 868, factorizing logic 870, generating logic 872, determining logic 874, comparing logic 876, taking action logic 878, creating logic 880, configuring logic 882, calculating logic 884, clustering logic 886, flagging logic 888, and grating/revoking logic 890.

In certain aspects, factorizing logic 870 includes logic for factorizing a user access co-occurrence data element to generate two data sub-elements.

In certain aspects, generating logic 872 includes logic for generating an approximated user access co-occurrence data element based on the product of the two data sub-elements.

In certain aspects, determining logic 874 includes logic for determining a first cluster of the one or more second clusters comprising the respective user access embedding. In certain aspects, determining logic 874 includes logic for determining a second cluster of the one or more first clusters comprising a user attribute embedding associated with a user corresponding to the respective user access embedding. In certain aspects, determining logic 874 includes logic for determining a similarity between the first cluster and the second cluster. In certain aspects, determining logic 874 includes logic for determining the similarity is below a threshold.

In certain aspects, determining logic 874 includes logic for determining a set similarity between a first cluster and a second cluster. In certain aspects, determining logic 874 includes logic for determining the similarity between the first cluster and the second cluster comprises calculating an average of the set similarities determined for each first set of the one or more first clusters and each second set of the one or more second clusters.

In certain aspects, comparing logic 876 includes logic for comparing the user access co-occurrence data element and the approximated user access co-occurrence data element to determine one or more anomalies, wherein each of the one or more anomalies relates to access for a user to a resource of the system. In certain aspects, comparing logic 876 includes logic for comparing the new resource attribute embedding to each resource attribute embedding to determine a closest resource attribute embedding associated with a closest resource of the system. In certain aspects, comparing logic 876 includes logic for comparing the new user attribute embedding to each user attribute embedding to determine a closest user attribute embedding associated with a closest user of the system.

In certain aspects, taking action logic 878 includes logic for taking one or more actions to rectify the one or more anomalies.

In certain aspects, creating logic 880 includes logic for creating, for each respective resource of the system, a resource attribute embedding based on a plurality of attributes of the respective resource. In certain aspects, creating logic 880 includes logic for creating a new resource attribute embedding for a new resource of the system. In certain aspects, creating logic 880 includes logic for creating, for each respective user of the system, a user attribute embedding based on a plurality of attributes of the respective user. In certain aspects, creating logic 880 includes logic for creating a new user attribute embedding for a new user of the system.

In certain aspects, configuring logic 882 includes logic for configuring access rights to the new resource for one or more users of the system based on one or more access rights associated with the closest resource. In certain aspects, configuring logic 882 includes logic for configuring access rights to one or more of the resources of the system for the new user based on one or more access rights associated with the closest user.

In certain aspects, calculating logic 884 includes logic for calculating a distance metric between the new resource attribute embedding and each resource attribute embedding. In certain aspects, calculating logic 884 includes logic for calculating a distance metric between the new user attribute embedding and each user attribute embedding. In certain aspects, calculating logic 884 includes logic for calculating a Jaccard index value.

In certain aspects, clustering logic 886 includes logic for clustering the user attribute embeddings created for the users of the system into one or more first clusters. In certain aspects, clustering logic 886 includes logic for clustering the user access embeddings associated with the users of the system into one or more second clusters. In certain aspects, clustering logic 886 includes logic for clustering the user attribute embeddings more than once to create multiple sets of the one or more first clusters. In certain aspects, clustering logic 886 includes logic for clustering the user access embeddings more than once to create multiple sets of the one or more second clusters.

In certain aspects, flagging logic 888 includes logic for flagging the user based on the similarity being below the threshold.

In certain aspects, granting/revoking logic 890 includes logic for granting the access for the user associated with the at least one of the one or more anomalies to the resource associated with the at least one of the one or more anomalies. In certain aspects, granting/revoking logic 890 includes logic for revoking the access for the user associated with the at least one of the one or more anomalies to the resource associated with the at least one of the one or more anomalies.

Note that FIG. 8 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method of computationally efficient anomaly detection, comprising: factorizing a user access co-occurrence data element to generate two data sub-elements, wherein: the user access co-occurrence data element represents co-occurrences between users of a system and resources of the system, a product of the two data sub-elements approximates the user access co-occurrence data element, and each of the two data sub-elements has reduced dimensionality compared to the user access co-occurrence data element; generating an approximated user access co-occurrence data element based on the product of the two data sub-elements; comparing the user access co-occurrence data element and the approximated user access co-occurrence data element to determine one or more anomalies, wherein each of the one or more anomalies relates to access for a user to a resource of the system; and taking one or more actions to rectify the one or more anomalies.

Clause 2: The method of Clause 1, wherein: factorizing the user access co-occurrence data element to generate the two data sub-elements comprises performing a non-negative matrix factorization, and the user access co-occurrence data element comprises a non-negative matrix.

Clause 3: The method of Clause 2, wherein: the non-negative matrix comprises a two-dimensional array of cells, each cell in the non-negative matrix corresponds to a respective user of the system and a respective resource of the system, and each cell in the non-negative matrix comprises a value indicating whether the user corresponding to the respective cell is denied or granted access to the resource corresponding to the respective cell.

Clause 4: The method of any one of Clauses 1-3, wherein taking the one or more actions to rectify the one or more anomalies comprises, for at least one of the one or more anomalies: granting the access for the user associated with the at least one of the one or more anomalies to the resource associated with the at least one of the one or more anomalies.

Clause 5: The method of any one of Clauses 1-4, wherein taking the one or more actions to rectify the one or more anomalies comprises, for at least one of the one or more anomalies: revoking the access for the user associated with the at least one of the one or more anomalies to the resource associated with the at least one of the one or more anomalies.

Clause 6: The method of any one of Clauses 1-5, wherein each of the one or more anomalies represents a first value associated with the user and the resource in the user access co-occurrence data element being different than a second value associated with the user and the resource in the approximated user access co-occurrence data element by at least a threshold amount.

Clause 7: The method of any one of Clauses 1-6, further comprising creating, for each respective resource of the system, a resource attribute embedding based on a plurality of attributes of the respective resource.

Clause 8: The method of Clause 7, further comprising: creating a new resource attribute embedding for a new resource of the system; comparing the new resource attribute embedding to each resource attribute embedding to determine a closest resource attribute embedding associated with a closest resource of the system; and configuring access rights to the new resource for one or more users of the system based on one or more access rights associated with the closest resource.

Clause 9: The method of Clause 8, wherein comparing the new resource attribute embedding to each resource attribute embedding to determine the closest resource attribute embedding associated with the closest resource of the system comprises calculating a distance metric between the new resource attribute embedding and each resource attribute embedding.

Clause 10: The method of any one of Clauses 7-9, wherein the plurality of attributes of the respective resource comprise at least one of: a bucket path associated with a respective resource, a table associated with the respective resource, a schema associated with the respective resource, or a database where the respective resource is stored.

Clause 11: The method of any one of Clauses 1-11, further comprising creating, for each respective user of the system, a user attribute embedding based on a plurality of attributes of the respective user.

Clause 12: The method of Clause 11, further comprising: creating a new user attribute embedding for a new user of the system; comparing the new user attribute embedding to each user attribute embedding to determine a closest user attribute embedding associated with a closest user of the system; and configuring access rights to one or more of the resources of the system for the new user based on one or more access rights associated with the closest user.

Clause 13: The method of Clause 12, wherein comparing the new user attribute embedding to each user attribute embedding to determine the closest user attribute embedding associated with the closest user of the system comprises calculating a distance metric between the new user attribute embedding and each user attribute embedding.

Clause 14: The method of any one of Clauses 11-13, wherein the plurality of attributes of the respective user comprise at least one of: a role of a respective user, a level of the respective user, a department of the respective user, a manager of the respective user, or an office where the respective user is assigned.

Clause 15: The method of any one of Clauses 11-14, further comprising clustering the user attribute embeddings created for the users of the system into one or more first clusters.

Clause 16: The method of Clause 15, wherein one of the two data sub-elements comprises user access embeddings associated with the users of the system, each respective user access embedding indicating one or more access rights for one or more resources of the system, and the method further comprises: clustering the user access embeddings associated with the users of the system into one or more second clusters.

Clause 17: The method of Clause 16, wherein at least one of clustering the user attribute embeddings or clustering the user access embeddings comprises performing a K-means clustering operation.

Clause 18: The method of any one of Clauses 16-17, further comprising, for at least one of the user access embeddings: determining a first cluster of the one or more second clusters comprising the respective user access embedding; determining a second cluster of the one or more first clusters comprising a user attribute embedding associated with a user corresponding to the respective user access embedding; determining a similarity between the first cluster and the second cluster; determining the similarity is below a threshold; and flagging the user based on the similarity being below the threshold.

Clause 19: The method of Clause 18, wherein: clustering the user attribute embeddings created for the users of the system into the one or more first clusters comprises clustering the user attribute embeddings more than once to create multiple sets of the one or more first clusters; clustering the user access embeddings created for the users of the system into the one or more second clusters comprises clustering the user access embeddings more than once to create multiple sets of the one or more second clusters; for each set of the one or more first clusters and each set of the one or more second clusters: determining the first cluster comprising the respective user attribute embedding; determining the second cluster comprising the respective user access embedding; determining a set similarity between the first cluster and the second cluster; and determining the similarity between the first cluster and the second cluster comprises calculating an average of the set similarities determined for each first set of the one or more first clusters and each second set of the one or more second clusters.

Clause 20: The method of any one of Clauses 18-19, wherein the similarity between the first cluster and the second cluster is calculated as a Jaccard index value.

Clause 21: A method for assigning access rights to resources of a system, comprising: creating a new user attribute embedding for a new user of the system; comparing the new user attribute embedding to user attribute embeddings created for users of the system to determine a closest user attribute embedding associated with a closest user of the system; and configuring access rights to one or more of the resources of the system for the new user based on one or more access rights associated with the closest user.

Clause 22: The method of Clause 21, further comprising creating, for each respective user of the system, a user attribute embedding based on a plurality of attributes of the respective user to generate the user attribute embeddings.

Clause 23: The method of Clause 22, wherein a trained encoder model is used to create the user attribute embeddings.

Clause 24: The method of any one of Clauses 22-23, wherein the plurality of attributes of the respective user comprise at least one of: a role of a respective user, a level of the respective user, a department of the respective user, a manager of the respective user, or an office where the respective user is assigned.

Clause 25: The method of any one of Clauses 21-24, wherein comparing the new user attribute embedding to the user attribute embeddings created for the users of the system to determine the closest user attribute embedding associated with the closest user of the system comprises calculating a distance metric between the new user attribute embedding and each user attribute embedding.

Clause 26: The method of any one of Clauses 21-25, further comprising: generating a user access co-occurrence data element, wherein the user access co-occurrence data element represents co-occurrences between the users and the resources of the system; factorizing the user access co-occurrence data element to generate two data sub-elements, wherein: a product of the two data sub-elements approximates the user access co-occurrence data element, each of the two data sub-elements has reduced dimensionality compared to the user access co-occurrence data elements, and one of the two data sub-elements comprises a user feature co-occurrence data element comprising user access embeddings associated with the users of the system; and determining the one or more access rights associated with the closest user using the user feature co-occurrence data element.

Clause 27: The method of Clause 26, wherein the user access co-occurrence data element comprises a non-negative matrix.

Clause 28: The method of Clause 27, wherein: the non-negative matrix comprises a two-dimensional array of cells, each cell in the non-negative matrix corresponds to a respective user of the system and a respective resource of the system, and each cell in the non-negative matrix comprises a value indicating whether the user corresponding to the respective cell is denied or granted access to the resource corresponding to the respective cell.

Clause 29: A method for assigning access rights to users a system, comprising: creating a new resource attribute embedding for a new resource of the system; comparing the new resource attribute embedding to resource attribute embeddings created for resources of the system to determine a closest resource attribute embedding associated with a closest resource of the system; and configuring access rights to one or more of the users of the system for the new resource based on one or more access rights associated with the closest resource.

Clause 30: The method of Clause 29, further comprising creating, for each respective resource of the system, a resource attribute embedding based on a plurality of attributes of the respective resource to generate the resource attribute embeddings.

Clause 31: The method of Clause 30, wherein a trained encoder model is used to create the resource attribute embeddings.

Clause 32: The method of any one of Clauses 30-31, wherein the plurality of attributes of the respective resource comprise at least one of: a bucket path associated with a respective resource, a table associated with the respective resource, a schema associated with the respective resource, or a database where the respective resource is stored.

Clause 33: The method of any one of Clauses 29-32, wherein comparing the new resource attribute embedding to the resource attribute embeddings created for the resources of the system to determine the closest resource attribute embedding associated with the closest resource of the system comprises calculating a distance metric between the new resource attribute embedding and each resource attribute embedding.

Clause 34: The method of any one of Clauses 29-33, further comprising: generating a user access co-occurrence data element, wherein the user access co-occurrence data element represents co-occurrences between the users and the resources of the system; factorizing the user access co-occurrence data element to generate two data sub-elements, wherein: a product of the two data sub-elements approximates the user access co-occurrence data element, each of the two data sub-elements has reduced dimensionality compared to the user access co-occurrence data elements, and one of the two data sub-elements comprises a resource feature co-occurrence data element comprising resource access embeddings associated with the resources of the system; and determining the one or more access rights associated with the closest resource using the user access co-occurrence data element.

Clause 35: The method of Clause 34, wherein the user access co-occurrence data element comprises a non-negative matrix.

Clause 36: The method of Clause 35, wherein: the non-negative matrix comprises a two-dimensional array of cells, each cell in the non-negative matrix corresponds to a respective user of the system and a respective resource of the system, and each cell in the non-negative matrix comprises a value indicating whether the user corresponding to the respective cell is denied or granted access to the resource corresponding to the respective cell.

Clause 37: A method of access rights management, comprising: factorizing a user access co-occurrence data element to generate two data sub-elements, wherein: the user access co-occurrence data element represents co-occurrences between users of a system and resources of the system, a product of the two data sub-elements approximates the user access co-occurrence data element, each of the two data sub-elements has reduced dimensionality compared to the user access co-occurrence data element, and one of the two data sub-elements comprises user access embeddings associated with the users of the system; clustering the user access embeddings associated with the users of the system into one or more first clusters; creating, for each respective user of the system, a user attribute embedding based on a plurality of attributes of the respective user; clustering the user attribute embeddings created for the users of the system into one or more second clusters; for at least one of the user access embeddings: determining a first cluster of the one or more first clusters comprising a first user access embedding; determining a second cluster of the one or more first clusters comprising a user attribute embedding associated with a user corresponding to the respective user access embedding; determining a similarity between the first cluster and the second cluster; determining the similarity is below a threshold; and flagging the user based on the similarity being below the threshold.

Clause 38: The method of Clause 37, wherein: clustering the user access embeddings created for the users of the system into the one or more first clusters comprises clustering the user access embeddings more than once to create multiple sets of the one or more first clusters; clustering the user attribute embeddings created for the users of the system into the one or more second clusters comprises clustering the user attribute embeddings more than once to create multiple sets of the one or more second clusters; for each set of the one or more first clusters and each set of the one or more second clusters: determining the first cluster comprising the respective user access embedding; determining the second cluster comprising the respective user attribute embedding; determining a set similarity between the first cluster and the second cluster; and determining the similarity between the first cluster and the second cluster comprises calculating an average of the set similarities determined for each first set of the one or more first clusters and each second set of the one or more second clusters.

Clause 39: The method of any one of Clauses 37-38, wherein at least one of clustering the user attribute embeddings or clustering the user access embeddings comprises performing a K-means clustering operation.

Clause 40: The method of any one of Clauses 37-39, wherein the similarity between the first cluster and the second cluster is calculated as a Jaccard index value.

Clause 41: The method of any one of Clauses 37-40, wherein the user access co-occurrence data element comprises a non-negative matrix.

Clause 42: The method of Clause 41, wherein: the non-negative matrix comprises a two-dimensional array of cells, each cell in the non-negative matrix corresponds to a respective user of the system and a respective resource of the system, and each cell in the non-negative matrix comprises a value indicating whether the user corresponding to the respective cell is denied or granted access to the resource corresponding to the respective cell.

Clause 43: The method of any one of Clauses 37-42, wherein a trained encoder model is used to create the user attribute embeddings.

Clause 44: The method of any one of Clauses 37-43, wherein the plurality of attributes of the respective user comprise at least one of: a role of a respective user, a level of the respective user, a department of the respective user, a manager of the respective user, or an office where the respective user is assigned.

Clause 45: A processing system, comprising: a memory comprising computer-executable instructions; and a processor configured to execute the computer-executable instructions and cause the processing system to perform a method in accordance with any one of Clauses 1-44.

Clause 46: A processing system, comprising means for performing a method in accordance with any one of Clauses 1-44.

Clause 47: A non-transitory computer-readable medium storing program code for causing a processing system to perform the steps of any one of Clauses 1-44.

Clause 48: A computer program product embodied on a computer-readable storage medium comprising code for performing a method in accordance with any one of Clauses 1-44.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of computationally efficient anomaly detection, comprising:

factorizing a user access co-occurrence data element comprising a non-negative matrix to generate two data sub-elements by performing a non-negative matrix factorization, wherein:

the user access co-occurrence data element represents co-occurrences between users of a system and resources of the system, a product of the two data sub-elements approximates the user access co-occurrence data element, each of the two data sub-elements has reduced dimensionality compared to the user access co-occurrence data element, the non-negative matrix comprises a two-dimensional array of cells, each respective cell in the non-negative matrix corresponds to a respective user of the system and a respective resource of the system, and each respective cell in the non-negative matrix comprises a value indicating whether the respective user corresponding to the respective cell is denied or granted access to the respective resource corresponding to the respective cell:

generating an approximated user access co-occurrence data element based on the product of the two data sub-elements, each of the two data sub-elements being factors of the user access co-occurrence data element;

comparing the user access co-occurrence data element and the approximated user access co-occurrence data element to determine one or more anomalies, wherein each of the one or more anomalies relates to access for a select user to a select resource of the system; and taking one or more actions to rectify the one or more anomalies.

2. The method of claim 1, wherein taking the one or more actions to rectify the one or more anomalies comprises, for at least one of the one or more anomalies:

granting the access for the select user associated with the at least one of the one or more anomalies to the select resource associated with the at least one of the one or more anomalies.

3. The method of claim 1, wherein taking the one or more actions to rectify the one or more anomalies comprises, for at least one of the one or more anomalies:

revoking the access for the select user associated with the at least one of the one or more anomalies to the select resource associated with the at least one of the one or more anomalies.

4. The method of claim 1, wherein each of the one or more anomalies represents a first value associated with the select user and the select resource in the user access co-occurrence data element being different than a second value associated with the select user and the select resource in the approximated user access co-occurrence data element by at least a threshold amount.

5. The method of claim 1, further comprising creating, for each respective resource of the system, a resource attribute embedding based on a plurality of attributes of the respective resource.

6. The method of claim 5, further comprising:

creating a new resource attribute embedding for a new resource of the system;

comparing the new resource attribute embedding to each resource attribute embedding to determine a closest resource attribute embedding associated with a closest resource of the system; and configuring access rights to the new resource for one or more users of the system based on one or more access rights associated with the closest resource.

7. The method of claim 6, wherein comparing the new resource attribute embedding to each resource attribute embedding to determine the closest resource attribute embedding associated with the closest resource of the system comprises calculating a distance metric between the new resource attribute embedding and each resource attribute embedding.

8. The method of claim 5, wherein the plurality of attributes of the respective resource comprise at least one of:

a bucket path associated with the respective resource, a table associated with the respective resource, a schema associated with the respective resource, or a database where the respective resource is stored.

9. The method of claim 1, further comprising creating, for each respective user of the system, a user attribute embedding based on a plurality of attributes of the respective user.

10. The method of claim 9, further comprising:

creating a new user attribute embedding for a new user of the system;

comparing the new user attribute embedding to the user attribute embedding associated with each respective user of the system to determine a closest user attribute embedding associated with a closest user of the system; and configuring access rights to one or more of the resources of the system for the new user based on one or more access rights associated with the closest user.

11. The method of claim 10, wherein comparing the new user attribute embedding to the user attribute embedding associated with each respective user of the system to determine the closest user attribute embedding associated with the closest user of the system comprises calculating a distance metric between the new user attribute embedding and the user attribute embedding associated with each respective user of the system.

12. The method of claim 9, wherein the plurality of attributes of the respective user comprise at least one of:

a role of the respective user, a level of the respective user, a department of the respective user, a manager of the respective user, or an office where the respective user is assigned.

13. The method of claim 9, further comprising clustering the user attribute embedding created for each respective user of the system into one or more first clusters.

14. The method of claim 13, wherein:

one of the two data sub-elements comprises user access embeddings associated with the users of the system, each respective user access embedding indicating one or more access rights for one or more resources of the system, and the method further comprises clustering the user access embeddings associated with the users of the system into one or more second clusters.

15. The method of claim 14, further comprising, for at least one of the user access embeddings:

determining a first cluster of the one or more second clusters comprising the respective user access embedding;

determining a second cluster of the one or more first clusters comprising a user attribute embedding associated with a user corresponding to the respective user access embedding;

determining a similarity between the first cluster and the second cluster;

determining the similarity is below a threshold; and flagging the user based on the similarity being below the threshold.

16. The method of claim 15, wherein:

clustering the user attribute embeddings created for the users of the system into the one or more first clusters comprises clustering the user attribute embeddings more than once to create multiple sets of the one or more first clusters;

clustering the user access embeddings created for the users of the system into the one or more second clusters comprises clustering the user access embeddings more than once to create multiple sets of the one or more second clusters;

for each set of the one or more first clusters and each set of the one or more second clusters:

determining the first cluster comprising the respective user attribute embedding;

determining the second cluster comprising the respective user access embedding;

determining a set similarity between the first cluster and the second cluster; and determining the similarity between the first cluster and the second cluster comprises calculating an average of the set similarity determined for each set of the one or more first clusters and each set of the one or more second clusters, wherein the similarity between the first cluster and the second cluster is calculated as a Jaccard index value.

17. A method of access rights management, comprising:

factorizing a user access co-occurrence data element to generate two data sub-elements, wherein:

the user access co-occurrence data element represents co-occurrences between users of a system and resources of the system, a product of the two data sub-elements approximates the user access co-occurrence data element, each of the two data sub-elements has reduced dimensionality compared to the user access co-occurrence data element, and one of the two data sub-elements comprises user access embeddings associated with the users of the system;

clustering the user access embeddings associated with the users of the system into one or more first clusters;

creating, for each respective user of the system, a user attribute embedding based on a plurality of attributes of the respective user;

clustering the user attribute embedding created for each respective user of the system into one or more second clusters;

for at least one of the user access embeddings:

determining a first cluster of the one or more first clusters comprising a first user access embedding;

determining a second cluster of the one or more first clusters comprising a second user attribute embedding associated with a user corresponding to the respective user access embedding;

determining a similarity between the first cluster and the second cluster;

determining the similarity is below a threshold; and flagging the user based on the similarity being below the threshold.

18. A processing system, comprising:

a memory comprising computer-executable instructions; and a processor configured to execute the computer-executable instructions and cause the processing system to:

factorize a user access co-occurrence data element comprising a non-negative matrix to generate two data sub-elements by performing a non-negative matrix factorization, wherein:

the user access co-occurrence data element represents co-occurrences between users of a system and resources of the system, a product of the two data sub-elements approximates the user access co-occurrence data element, each of the two data sub-elements has reduced dimensionality compared to the user access co-occurrence data element, the non-negative matrix comprises a two-dimensional array of cells, each respective cell in the non-negative matrix corresponds to a respective user of the system and a respective resource of the system, and each respective cell in the non-negative matrix com-
prises a value indicating whether the respective
user corresponding to the respective cell is denied
or granted access to the resource corresponding to
the respective cell;

generate an approximated user access co-occurrence data
element based on the product of the two data sub-
elements, each of the two data sub-elements being
factors of the user access co-occurrence data element;

compare the user access co-occurrence data element and
the approximated user access co-occurrence data ele-
ment to determine one or more anomalies, wherein
each of the one or more anomalies relates to access for
a select user to a select resource of the system; and take one or more actions to rectify the one or more
anomalies.

19. The processing system of claim 18, wherein the
processor is configured to cause the processing system to
take the one or more actions to rectify the one or more
anomalies by, for at least one of the one or more anomalies,
granting the access for the select user associated with the at
least one of the one or more anomalies to the select resource
associated with the at least one of the one or more anomalies.

20. The processing system of claim 18, wherein the
processor is configured to cause the processing system to
take the one or more actions to rectify the one or more
anomalies by, for at least one of the one or more anomalies,
revoking the access for the select user associated with the at
least one of the one or more anomalies to the select resource
associated with the at least one of the one or more anomalies.

* * * * *